(12) United States Patent
Hunzinger et al.

(10) Patent No.: US 8,483,119 B2
(45) Date of Patent: Jul. 9, 2013

(54) SYSTEM AND METHOD FOR WIRELESS COMMUNICATION DIVERSITY RETRANSMISSION RELAY

(75) Inventors: Jason Frank Hunzinger, Escondido, CA (US); Jilei Hou, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 247 days.

(21) Appl. No.: 12/961,368

(22) Filed: Dec. 6, 2010

(65) Prior Publication Data
US 2012/0140695 A1 Jun. 7, 2012

(51) Int. Cl.
*H04W 40/00* (2009.01)
(52) U.S. Cl.
USPC ......................................................... 370/315
(58) Field of Classification Search
USPC ................................................. 370/254–430
See application file for complete search history.

(56) References Cited

U.S. PATENT DOCUMENTS

| | | | | |
|---|---|---|---|---|
| 7,975,199 | B2 * | 7/2011 | Chindapol et al. ............ | 714/751 |
| 8,165,059 | B2 * | 4/2012 | Fujii et al. ..................... | 370/315 |
| 2005/0238053 | A1 * | 10/2005 | Iochi et al. ..................... | 370/473 |
| 2006/0153061 | A1 * | 7/2006 | Nishio ........................... | 370/208 |
| 2006/0203760 | A1 * | 9/2006 | Fukui et al. ................... | 370/328 |
| 2007/0189160 | A1 * | 8/2007 | Landau et al. ................. | 370/230 |
| 2010/0150007 | A1 * | 6/2010 | Jung et al. ..................... | 370/252 |
| 2010/0296432 | A1 * | 11/2010 | Mehta et al. ................... | 370/315 |
| 2011/0182215 | A1 * | 7/2011 | Gorokhov ..................... | 370/280 |
| 2012/0231803 | A1 * | 9/2012 | Soliman et al. ............... | 455/450 |

OTHER PUBLICATIONS

3GPP TSG RAN WG1 Meeting #58, R1-093044, "Issues of Type 2 Relay", Huawei, Shenzhen, China, Aug. 24-28, 2009, pp. 1-7.
International Search Report and Written Opinion—PCT/US2011/063610—ISA/EPO—May 22, 2012.
Research in Motion et al: "Type-II Relay DL/UL Transmission Schemes", 3GPP Draft; R1-092420(RIM-Type 2 Relay_TX), 3rd Generation Partnership Project (3GPP), Mobile Competence Centre ; 650, Route Des Lucioles ; F-06921 Sophia-Antipolis Cedex ; France, no. Los Angeles, USA; 20090624, Jun. 24, 2009, XP050350934, [retrieved on Jun. 24, 2009].
Vodafone, "3GPP TSG-RAN WG1 #56bis, R1-091403, Further Consideration on L2 Transparent Relay," Agenda 15.3, Mar. 2009, Seoul, KR.
Zte: "Cooperation Scheme Considerations for Type II Relay", 3GPP Draft; R1-091710, 3rd Generation Partnership Project (3GPP), Mobile Competence Centre ; 650, Route Des Lucioles ; F-06921 Sophia-Antipolis Cedex ; France, no. San Francisco, USA; 20090428, Apr. 28, 2009, XP050339245, [retrieved on Apr. 28, 2009].
Zte: "Type II relay for DL cooperative retransmission", 3GPP Draft; R1-091711 Type II Relay For DL Cooperative Retransmission, 3rd Generation Partnership Project (3GPP), Mobile Competence Centre : 650, Route Des Lucioles ; F-06921 Sophia-Antipolis Cedex ; France, no. San Francisco, USA; 20090428, Apr. 28, 2009, XP050339246, [retrieved on Apr. 28, 2009].

* cited by examiner

*Primary Examiner* — Ayaz Sheikh
*Assistant Examiner* — Debebe Asefa
(74) *Attorney, Agent, or Firm* — Darren M. Simon

(57) ABSTRACT

A wireless communication system transmits a data packet from a cell to a terminal and to a diversity relay. The diversity relay stores the data packet and, based on a state of an acknowledgement signal from the terminal indicating a failure of the terminal to receive and decode the data packet, determines that a subsequent data packet will be a retransmission and, in response, retrieves and transmits the stored data packet to the terminal, cooperative with the retransmission from the data packet from the cell to the terminal. Optionally, the diversity relay transmits pilot signals to the terminal and, optionally, modifies channel quality reports sent from the terminal to the cell.

21 Claims, 10 Drawing Sheets

SYSTEM AND METHOD FOR WIRELESS COMMUNICATION DIVERSITY RETRANSMISSION RELAY

BACKGROUND

1. Field

The present Application for Patent relates to communication and, more particularly, to the providing and managing of communication resources in a wireless communication system.

2. Background

Wireless communication systems are widely deployed and provide communication between and among mobile and fixed communication of various content including, as illustrative example, voice, video, messaging, games, financial data and various data representing and relating to each. A wireless communication system may include multiple-access capability, using various time and frequency multiplexing systems and schemes that allow for sharing of available system resources. Examples of multiple-access systems include Code Division Multiple Access (CDMA) systems, Time Division Multiple Access (TDMA) systems, and Frequency Division Multiple Access (FDMA) systems. Many of these example types of multiple access systems have sub-types such as, for FDMA, Orthogonal FDMA (OFDMA) systems, and Single-Carrier FDMA (SC-FDMA) systems.

A wireless communication system may include a plurality of base stations, each supporting communication for a plurality of terminals, of a number that may vary with time. Communication between a base and a terminal is through links, typically termed as forward links and reverse links The forward link (also known as a "downlink") typically refers to the communication link(s) from the base station to the terminal, and the reverse link (also known as an "uplink") typically refers to the communication link from the terminal to the base station. The forward and reverse link(s) may or may not share a common physical channel, may or may not share a common carrier frequency, and may or may not share a common encoding and/or modulation scheme.

A base station may cover a respective geographical area, and geographically adjacent base stations may cover respectively adjacent geographical areas that may, or may not, overlap. A base station may maintain forward links with each of a plurality of terminals, each of which may, or may not be within a geographical area assigned to the base station. Due to various factors, at various times the respective channels for the forward link or reverse link, or both, of one or more of the terminals may have a higher, or lower quality, than the corresponding channels for the forward or reverse link, or both, of one or more of the other terminals.

The various factors that may relate to such differences in channel quality include, but are not limited to, differences of geographical distances between the base station and each of the different terminal, different terrestrial (natural or man made) features along the respective different paths, different atmospheric conditions, and/or different interference sources, either local to the terminals or along the path between the terminal and the base station.

Deployment of wireless relays in wireless communication networks has been considered as one potential remedy or compensation for such differences in channel quality because, in theory, potential benefits that have been identified as possible include a broadening or extension of coverage, and an increase in channel capacity.

However, although potential benefits of wireless relays have been seen as possibly significant, various significant problems, both potential and exhibited have been seen as well.

For example, pico cells or femto cells (home NodeBs), which may be viewed as a type of relay, but having only a subset of desired relay functions, have been employed, but these generally require either wired backhaul (such as fiber, cable or DSL) or wireless backhaul over a different wireless technology (e.g. microwave). Femto cells may also have restrictions as to which user equipment (UEs) can associate with them and, further may have considerable additional interference issues. In contrast, desired relays will "self-backhaul".

Another example of a deployed type of relay is a repeater, which can be considered a sub-class of a relay. Repeaters, as their name implies, repeat signals by receiving a signal, either in the forward link or reverse link, and repeating that received signal. However, repeaters generally amplify and forward an "unclean" copy of signals thus typically amplifying interference and noise as well as useful signal and may be unnecessarily redundant. This low protocol layer level of repeaters also means they generally do not take advantage of different medium and link conditions (channel quality) on different hops.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any aspect. Its sole purpose is to present some concepts of one or more aspects in a simplified form as a prelude to the more detailed description that is presented below.

According to one aspect, a diversity relay is provided for a cellular communication system, the diversity relay having, according to one aspect, a scheduling receiver to receive transmission of a scheduling information signal from a cell to a destination terminal, the scheduling information signal identifying the destination terminal, and a data receiver to receive transmission of a data packet signal corresponding to the received scheduling information signal, and extract a corresponding data packet. According to one aspect, a diversity relay includes a storage to retrievably store the data packet, and a response receiver to receive a response information signal from the destination terminal representing one of a correct or error decoding by the destination terminal's of the data packet associated with the data packet signal corresponding to the received scheduling information. Further according to one aspect, the diversity relay includes a controller to determine, based on at least one of receiving the response information signal or not receiving the response information signal, whether or not a future transmission from the stored data packet signal will be a retransmission of that data packet and, if determining the future transmission to be a retransmission, performing a retransmitting of the stored data packet in response to receiving a future scheduling information signal identifying the destination terminal. In one aspect, the retransmission includes retrieving the stored data packet of the first transmission. According to an aspect, the diversity relay includes a transmitter to transmit a diversity data packet signal based on the retrieved stored data packet.

In one aspect, a diversity relay's retrieving of the received data packet includes encoding the retrieved data packet according to a new coding indicated by the scheduling information and, according to one aspect, the diversity relay transmitter transmits the retrieved data packet encoded according to the new coding.

According to one aspect, the scheduling information includes a first part preceding a second part, the first part including an identifier of the destination terminal and the second part including a retransmission count value indicating whether or not a data packet associated with the scheduling information is a first transmission or a retransmission. In one further aspect, a diversity relay includes a controller configured to retrieve, if the determining indicates the future transmission will be a retransmission, the stored data packet prior to the scheduling receiving the second part of the scheduling information.

In one aspect, a controller of a diversity relay is configured to detect a pattern of an incremental redundancy used by the cell and to identify an encoding of a data packet of the future transmission, prior to the diversity relay receiving the future transmission, based on the detected pattern.

In one alternative aspect, a diversity relay includes a controller further configured to detect a pattern of an incremental redundancy used by the cell, and to identify an encoding of a data packet of the future transmission, prior to the diversity relay receiving the future transmission, based on the detected pattern and, in one aspect, the controller is configured to encode the retrieved stored data packet according to the identified encoding.

According to one aspect, a diversity relay further comprises a pilot signal transmitter, controlled by the controller, to transmit from the diversity relay to a terminal a downlink pilot channel and, in one aspect, the controller is configured to control the pilot signal transmitter to transmit a pilot signal according to a timing cooperative with a timing of a transmission of a pilot from the cell to the terminal.

In another aspect, a diversity relay includes a controller configured to generate a channel quality information identifying a channel from the cell to the destination terminal, the channel quality information having a value independent of a channel quality information transmitted from the destination terminal to the cell for said channel.

One aspect includes a method for cellular communication, comprising receiving and storing at a diversity relay a first transmission of a data packet from a cell to a destination terminal, receiving at the diversity relay a response information indicating at least one of a response or a non-response by the destination terminal to said first transmission, determining at the destination terminal, based on the response information, whether or not a future transmission of a data packet from the cell to the destination terminal will be a retransmission of the data packet of the first transmission, receiving at the diversity relay at least a portion of a scheduling information identifying a schedule for a second transmission of a data packet from the cell to the destination terminal, and, in response to said receiving at least a portion, if the determining indicated the future transmission will be a retransmission, retrieving the stored data packet of the first transmission and transmitting the retrieved data packet from the diversity relay to the destination terminal, else storing at the diversity relay a data packet of the second transmission as a new first transmission of a data packet.

According to one aspect, a method includes in retrieving of the received data packet an encoding the retrieved data packet according to a new coding indicated by the scheduling information and, according to one aspect, and transmits the retrieved data packet encoded according to the new coding.

According to one or more aspects, the scheduling information includes a first part preceding a second part, the first part including an identifier of the destination terminal and the second part including a retransmission count value indicating whether or not a data packet associated with the scheduling information is a first transmission or a retransmission. In one further aspect, if the determining indicates the future transmission will be a retransmission, the stored data packet is retrieved prior to receiving the second part of the scheduling information.

In one aspect, a method includes detecting a pattern of an incremental redundancy used by the cell, and identifying an encoding of a data packet of the future transmission, prior to the diversity relay receiving the future transmission, based on the detected pattern.

In one alternative aspect, a method includes detecting a pattern of an incremental redundancy used by the cell, identifying an encoding of a data packet of the future transmission, prior to the diversity relay receiving the future transmission, based on the detected pattern and, in one aspect, encoding the retrieved stored data packet according to the identified encoding.

According to one aspect, a method includes transmitting from a diversity relay to a terminal a downlink pilot channel and, in one aspect, transmitting a pilot signal according to a timing cooperative with a timing of a transmission of a pilot from the cell to the terminal.

In another aspect, a method includes generating at a diversity relay a channel quality information identifying a channel from the cell to the destination terminal, the channel quality information having a value independent of a channel quality information transmitted from the destination terminal to the cell for the channel and, according to one aspect, transmitting the generated channel quality information to the cell.

In one aspect, diversity relay according to one or more exemplary embodiments includes in a cellular communication system having means for receiving a first transmission of a data packet signal from a cell to a destination terminal and for generating a corresponding data packet, means for storing said data packet, means for receiving a response information indicating at least one of a response or a non-response by the destination terminal to said first transmission, means for determining, based on said response information, whether or not a future transmission of a data packet signal from the cell to the destination terminal will be have retransmission of the data packet of the first transmission, means for receiving at least a portion of a scheduling information signal identifying a schedule for a second transmission of a data packet from the cell to the destination terminal, and means for retrieving, in response to said receiving at least a portion after said means for determining determines the future transmission will be a retransmission, the stored data packet of the first transmission and transmitting the retrieved data packet to the destination terminal.

In yet another aspect, a computer program product comprises a computer readable storage medium comprising: codes for causing a computer to receive and store a first transmission of a data packet from a cell to a destination terminal, codes for causing a computer to receive a response information indicating at least one of a response or a non-response by the destination terminal to the first transmission, codes for causing a computer to determine, based on the response information, whether or not a future transmission of a data packet from the cell to the destination terminal will be a retransmission of the data packet of the first transmission, codes for causing a computer to receive at least a portion of a scheduling information identifying a schedule for a second transmission of a data packet from the cell to the destination terminal; and codes for causing a computer, if the determining indicated the future transmission will be a retransmission, in response to said receiving at least a portion, to retrieve the stored data packet of the first transmission and transmit the retrieved data packet to the destination terminal, else to cause a computer to store a data packet of the second transmission as a new first transmission of a data packet.

According to one aspect, a plurality of terminals may be linked to the cell and, according to further aspect a selecting at the diversity relay selects one or more destination terminals from among the plurality of terminals and, in one aspect, the selecting is based on at least one of a response signal timing pattern between the terminals and the base station, or a conflict between a channel quality indicator (CQI) report timing of the terminals and a timing of transmissions of the diversity relay with respect to one or more current destination terminals.

In one aspect the transmissions of data packet signals from the cell and from the diversity relay are according to a hybrid automatic repeat request (HARQ) protocol, and the transmissions of response signals from the terminals are according to an ACK/NAK of a HARQ protocol. In one aspect, each of the plurality of terminals has a corresponding HARQ interlace and, further according to one aspect, the selecting is based, at least in part, on the terminal selected having an HARQ interlace spaced sufficiently to meet a given criteria.

To the accomplishment of the foregoing and related ends, one or more aspects comprise features hereinafter fully described and particularly pointed out in the claims. The following description and annexed drawings set forth in detail certain illustrative features of one or more aspects. These features are indicative, however, of but a few of various ways in which principles of various aspects may be employed. Other advantages and novel features will become apparent from the following detailed description when considered in conjunction with the drawings and the disclosed aspects are intended to include all such aspects and their equivalents.

DETAILED DESCRIPTION

Figure 1:
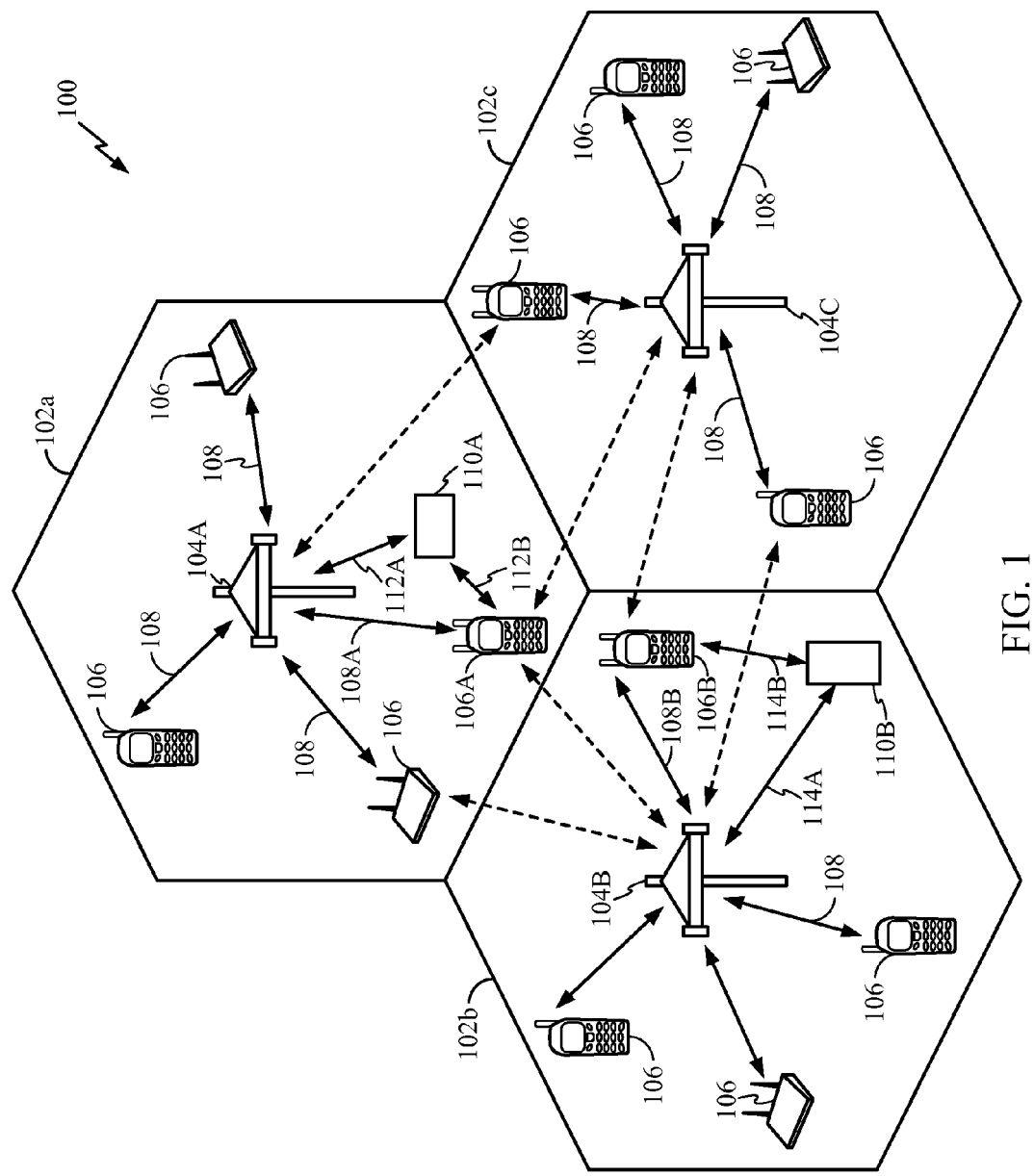
FIG. 1 shows a wireless communication system.

Various aspects are now described with reference to the drawings. In the following description, for purposes of explanation, numerous specific details are set forth to provide a thorough understanding sufficient to practice according to one or more aspects. It may be evident, however, that such aspect(s) may be practiced without these specific details. In other instances, well-known structures and devices are shown in block diagram form to facilitate describing these aspects.

Techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. Components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with one or more of a terminal and a base station. With respect to "terminal," a terminal can also be called, and may contain some or all of the functionality of, for example, a system, subscriber unit, subscriber station, mobile station, mobile, wireless terminal, node, device, remote station, remote terminal, access terminal, user terminal, wireless communication device, wireless communication apparatus, user agent, user device, or user equipment (UE), and the like. A terminal can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card, and/or another processing device for communicating over a wireless system. With respect to "base station," a base station may be utilized for communicating with wireless terminal(s) and can also be called, and may contain some or all of the functionality of, an access point, node, Node B, e-NodeB, e-NB, or some other network entity.

Various aspects are described herein in connection with a "cell." The term "cell," as used herein, encompasses, but is not limited to, the geographical area over which a particular base station, or base station resources, can establish forward and reverse links with a terminal that meet a given channel quality requirement and, in addition, these meanings include the base station or base station resource associated with that cell. As illustrative example, statements such as "a forward link from cell X to terminal Y" may be synonymous with "a forward link from the base station of cell X to terminal Y", or "a forward link from any base station of cell X to terminal Y." Similarly, statements such as "a terminal Y within cell X" may be synonymous with "a terminal Y within the geographical area over which base station X, or base station resources X, can establish forward and reverse links with that terminal Y sufficient to meet a given channel quality requirement."

Various aspects or features will be presented in terms of systems that may include a number of devices, components, modules, and the like. It is to be understood and appreciated that various systems may include additional devices, components, modules, and so forth, and/or may not include all devices, components, modules, and so on, discussed in connection with the figures. A combination of these approaches may also be used.

The word "exemplary" (and variants thereof) is used to mean serving as an example, instance, or illustration. Any aspect or design described herein as "exemplary" is not necessarily to be construed as preferred or advantageous over other aspects or designs. Rather, use of the word "exemplary" is only intended to illustrate example applications of concepts using simplified concrete examples.

To the extent that the term "includes" is used in either the detailed description or the claims, that term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

FIG. 1 depicts one illustrative communication system 100 in which one or more exemplary embodiments may be practiced. For purposes of illustration, FIG. 1 shows the communication system 100 having three cells, labeled 102A, 102B, and 102C, individually and generically referenced as 102. Each cell 102 is shown having one illustrated base station 104, labeled specifically as 104A, 104B and 104C, respectively. It will be understood that the suffixes "A" "B" and "C" are only labels added for purposes of making reference to a specific one of the base stations 104, as all of these may or may not have identical structure or performance specifications. Each of the cells 102 is shown having four terminals 106, with one terminal 106A in cell 102A and one terminal 106B in cell 102B being specifically labeled for description of various example operations. Each of the terminals 106 may, or may not have the same structure or range of functions. Terminals 106 may be mobile or may be fixed. A terminal 106 being shown in a particular cell does not mean that terminal cannot, with or without changing position, be linked to a base station 104 not within the same depicted cell.

It will be understood that the example system 100 is only for purposes of describing concepts and features of various exemplary embodiments. For example, wireless communication system 100 may, but does not necessarily, have many more than three cells 102, and cells 102 may have many more than four terminals 106 coupled to the base station(s). Likewise it will be understood that each cell 102 shown with just one base station 104 is only for purposes of providing a simplified example, as communication systems such as exemplified by FIG. 1 may have one or more cells 102 that may have more than one base station 104. Further, each of the example communication system 100 cells is drawn, for purposes of illustration, as a hexagonal region, and each of the hexagonal regions is shown as abutting two adjacent hexagonal regions, with no interstitial gaps between and no overlap of cells. It will be understood, however, that the example communication system 100 as shown in FIG. 1 uses depictions that are simplified for purposes of facilitating a ready understanding of concepts pertinent to the embodiments, without burdening the description with details not specific to the embodiments. For example, as readily appreciated, in actually constructed and operating cellular wireless communication systems, cells corresponding to cells 102 are not necessarily hexagonal in shape, are not necessarily of the same shape, and may or may not have the same area. Further, there may be gaps between adjacent cells, holes within cells, or overlap between various adjacent cells. It will be understood that overlaps (not shown in the FIG. 1 example) may occur between adjacent cells 102, and these may be areas in which a terminal 106 may select or reselect between either cell's base station 104 based on, for example, internal selection algorithms or selection criteria, or in which a terminal 106 may be handed off from the base station 104 of one of these overlapping cells 102 to the base station 104 of the other of overlapping cells 102 for purposes such as, for example, load balancing. According to one or more aspects, such reselection or re-assigning may not be particular to a practice according to one or more of the various exemplary embodiments and therefore, except where description of particular operations of such reselection or re-assigning may further assist in understanding an example or illustrative operation according to or within one or more aspects, further detailed description will be omitted.

With continuing reference to FIG. 1, each of the terminals 106 may be coupled by a forward link and a reverse link, collectively represented by a single double ended arrow 108, to a respective base station 104. The forward link and reverse link represented by each label 108 will be referenced collectively as a "communications link." The depicted example cell 102A includes a diversity retransmission relay (DRR) 110A in accordance with one or more aspects of one or more of the various exemplary embodiments. Likewise the depicted example cell 102B includes a DRR 110B also in accordance with one or more aspects. For purposes of brevity, the reference label "DRR 110" encompasses both DRR 110A and DRR 110B, and is used for description of aspects that may be generic to both DRR 110A and DRR 110B (and any other DRRs 110, in the same or in a different cell than DRR 110A or DRR 110B). Description in reference to one of DRR 110A or DRR 110B is used for illustrative operations on one, but does not necessarily mean that the description does not apply to the other.

It will be understood that the particular location on the FIG. 1 drawing of the each of the DRRs 110 is for purposes of clear depiction, and may or may not represent an actual proportional relation between a geographical distance from the DRR 110 to the base station 104 of its cell, e.g., the distance from DRR 110A to the base station 104A, or the geographical distance from the DRR 110 to the terminals 106, e.g., the geographical distance from DRR 110A to the terminal 106A or to any of the terminals 106 other than 106A.

In one aspect, a DRR 110 such as DRR 110A receives, monitors or otherwise detects forward link scheduling transmissions and data transmissions on the communications link 108B from the base station 104B to terminal 106B, stores data packets of the transmissions, and receives, monitors, or otherwise detects certain reverse link acknowledging transmissions on the communications link 108A from the terminal 106A to the base station 104A. According to one aspect, the acknowledging transmissions from the destination terminal 106A, or absence of acknowledging transmissions, are indicative of whether the destination terminal 106A received or correctly decoded the data packet within a data transmission from the base station 104A to that destination terminal 106A. Similarly, according to one aspect, the acknowledging transmissions from the destination terminal 106B, or absence of acknowledging transmissions, are indicative of whether the destination terminal 106B received or correctly decoded the data packet within a data transmission from the base station 104B to that destination terminal 106B.

According to one aspect, DRR 110A may determine, based on its detecting the acknowledging transmissions from the destination terminal 106A, or absence of such acknowledging transmissions, whether or not a data packet of a future data transmission from the base station 104A to the destination terminal 106A will be a re-transmission of the data packet previously received and stored at the DRR 110A. Similarly, the DRR 110B according to one or more embodiments may determine, based on its detecting the acknowledging transmissions from the destination terminal 106B, or absence of acknowledging transmissions, whether or not a data packet of a future data transmission from the base station 104B to the destination terminal 106B will be a re-transmission of the data packet previously received and stored at the DRR 110B.

In one aspect, after DRR 110A determines that a future data transmission from the base station 104A to the destination terminal 106A will be a retransmission, upon detecting a scheduling signal identifying destination terminal 106A, retrieves the stored data packet and retransmits the retrieved packet. According to one aspect, the retransmission by DRR 110A is substantially aligned in time, or concurrent with the retransmission by the base station 104A.

According to one aspect, the DRR 110 may operate in-band, meaning the DRR 110 may transmit diversity retransmissions at the same frequency as the retransmission from the base station 104. Further to this one aspect, the DRR 110 may be configured to provide duplex operation of either transmitting or receiving on a Downlink (DL) carrier at one time.

According to one aspect, DRR 110 may be an FDD relay and may be used in a single carrier or multi-carrier HSPA/HSPA+ UMTS FDD system.

It will be appreciated that the various benefits and advantages that may be provided by a DRR 110 according to the exemplary embodiments may include a statistical increase in the payload of data frame, e.g., a MAC frame, because a channel from a base station 104 to a given terminal 106 will appear, for that terminal 106, better than it may have appeared absent the DRR 110.

Another example among the various benefits and advantages is that a diversity retransmission relay, e.g., DRR 110A or DRR 110B, according to one or aspects may provide an added diversity and, incremental redundancy benefits, without requirement for upper protocol layers in the DRR 110 (e.g. RLC/RLP).

Further aspects of various exemplary embodiments will now be described in greater detail. To better facilitate a ready and complete understanding of the relevant concepts, various portions of the description will reference specific illustrative operations. Generally, unless otherwise made clear from the context, it will be assumed that the described example operations are within, or are in relation to, a wireless communication system in which a packet is transmitted from a base station to a terminal and is then conditionally retransmitted to the terminal, according to whether or not the base station receives, directly or indirectly, an acknowledgement signal from the terminal. Such retransmission systems will be generically referenced, for purposes of consistency in terminology, as Acknowledgment Receipt Request (ARQ) communication systems. It will be understood that this reference name encompasses but is not limited to conventional ARQ, is not intended as having any meaning as to structure, system topology, system architecture, hardware, allocation or distribution of functions, performance, or capacity. It simply references communication systems or methods in which packets, blocks of packets, portions of packets, or even coding symbols are conditionally retransmitted to an intended destination terminal based on receiving, or not receiving, an acknowledgment from that destination terminal, either directly or indirectly.

As will be appreciated, there many kinds, standards and protocols, and variations of each, in use or known. To facilitate a reader having ordinary skill in the art in readily understanding relevant concepts sufficient to clearly enable such a person to practice according to one or more of the various embodiments, description of specific example and illustrative operations may be in reference to one or more specific ones, or classes, of these standards or protocols of conditional retransmission communication systems or methods. It will be understood, though, that these specific references or referrals to particular ones or classes, of these standards or protocols is not intended as, and does not operate to limit any aspects or any of the various embodiments to such specific standards or protocols.

As one example, various illustrative operations may be described in reference to an ARQ system in which one or more error detection (ED) bits, e.g., parity bits, are added to a data packet before being transmitted from a base station to a destination terminal. In such ARQ systems the destination terminal may be able to only detect a decoding error, without any ability to correct the error. In the detailed description below of operations and features specific, at least in part, to such conditional retransmission systems or methods, the system or method will be referenced as an ARQ system or method.

As another example, various illustrative operations may be described in reference to an Acknowledgement Receipt Request (ARQ) system in which ED bits and forward error correction (FEC) bits are added to a data packet before being transmitted from a base station to a destination terminal. In such ARQ systems the destination terminal may, depending on the number of errors, be able to both detect a decoding error and correct the error. The number of errors that can be corrected is based on the FEC bits of that packet, or in the FEC bits of that packet combined with the FEC bits of retransmissions of packet. In the detailed description below of operations and features specific, at least in part, to such conditional retransmission systems or methods the system or method will be referenced as a hybrid ARQ (HARQ) system or method. HARQ systems in which one or more aspects of various exemplary embodiments may be practiced, or with which such aspect and embodiments may be combined, may include UMTS systems.

Further to the HARQ example, illustrative operations according to one aspect may be described in reference to HARQ systems or methods in which a packet, in both its first transmission from a base station to a destination terminal and in its retransmissions, includes both the ED and the FEC bits. In such HARQ systems the destination terminal may, depending on the number of errors, be able to both detect a decoding error and correct the error. In the detailed description below of illustrative operations and features specific, at least in part, to such conditional retransmission, the example system or method will be referenced as a non-incremental HARQ. One illustrative example of one non-incremental HARQ system on which or in which one or more aspects may be practiced may include HARQ Type I systems or methods.

Further still to the HARQ example, certain illustrative operations may be described in reference to HARQ systems or methods in which a packet, in its first transmission from a base station to a destination terminal includes only ED bits, with FEC bits being included only in retransmissions. In the detailed description below of illustrative operations and features specific, at least in part, to such conditional retransmission, the system or method will be referenced as an incremental HARQ. Incremental HARQ communication systems in which one or more aspects of various exemplary embodiments may be practiced, or with which such aspect and embodiments may be used or combined may include HARQ Type II or HARQ Type III systems or methods.

One or more aspects according to various exemplary embodiments may be within, or operate on, or used in combination with stop-and-repeat HARQ communication systems and selective repeat HARQ communication systems.

Unless otherwise stated, or otherwise made clear from the context, further detailed description of example and illustrative operations will assume, for convenience in description, a non-incremental HARQ communication system. Stated more particularly, since the DRR 110 according to one or more of the various exemplary embodiments stores a first transmission of a data packet from the base station 104 to a terminal 106, and then conditionally retrieves from its storage and retransmits that data packet with a timing cooperative with the retransmission of that packet by the base station 104, it may be simpler to first describe such cooperation by assuming retransmissions of a data packet use the same coding as earlier transmissions. Various example modifications or variations to adapt and use the embodiments with an incremental HARQ will be described. Other modifications and variations, and alternatives to the described modifications and variations will be readily apparent to persons of ordinary skill in the art, upon reading this disclosure.

Likewise, unless otherwise stated, or otherwise made clear from the context, further detailed description of example and illustrative operations according to aspects of one or more of exemplary embodiments will assume, for convenience in description, a selective-repeat, as opposed to a stop-and-wait HARQ communication system. However, a person of ordinary skill in the arts pertaining to these embodiments can readily identify, and make modifications sufficient to adapt and use the embodiments with stop-and-wait HARQ communications systems.

Figure 2:
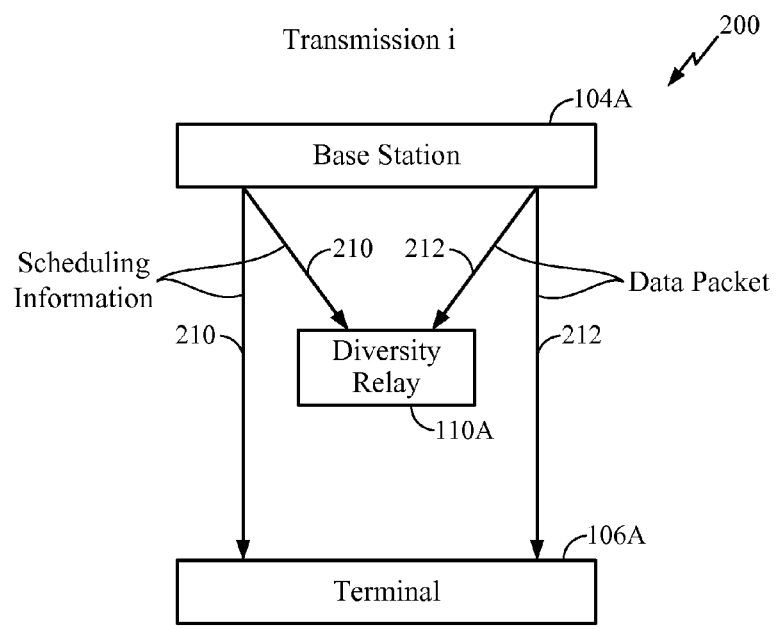
FIG. 2 is a high level schematic of transmissions of a base station to diversity retransmission relay and a terminal.

FIG. 2 is a high level graphical representation of a portion of one example cooperative action 200 of a DRR 110A, base station 104A, and terminal 106A depicted in the FIG. 1 cell 102A. The reference to the specific cell 102A and its DRR 110A, base station 104A, and terminal 106A is only for purposes of example. The cooperative action may represent any cell 102, and any DRR 110, base station 104, and terminal 106 in that cell 102. The FIG. 2 example assumes the DRR 110A is coupled to the base station 104A by a link such as, for example, the link 112A of FIG. 1. The coupling of the DRR 110A to the base station 104A that is assumed by FIG. 2 may be a FIG. 1 link 112A having only a forward link or, according to one aspect, may include both a forward and a reverse link. Likewise, the FIG. 2 example assumes the DRR 110A is coupled to the terminal 106A by, for example, a link such as the FIG. 1 link 112B, which may include a forward link and a reverse link.

Referring back to FIG. 1, as will be described in greater detail in later sections, the forward link of link 112B may carry diversity retransmissions of data packets from the DRR 110A to the terminal 106A, and the reverse link of link 112B may carry acknowledgement signals from the terminal 106A to the DRR 110A. In addition, a link 114A is shown coupling base station 104B of cell 102B to the DRR 110B of that cell, and a link 114B is shown coupling DRR 110B to terminal 106B. It will be understood that this depicts one example arrangement and, further, that in such an arrangement DRR 110B may cooperate with base station 104B and terminal 106B in a manner that may, but is not necessarily identical to the manner DRR 110A cooperates with base station 104A and terminal 106A.

It will be understood that the base station 104A may, or may not, be aware of the diversity relay 110A. It will also be understood that the terminal 106A, although receiving diversity retransmissions of data packets from the DRR 110A, and benefiting from such reception may, or may not be aware of the DRR 110A as an entity separate from the base station 104A.

Referring to FIG. 2, together with the FIG. 1 example communication system 100, in one example cooperative action 200 the DRR 110A may begin by receiving a transmission 210 of a scheduling information that is also sent from the base station 104A to the terminal 106A. The DRR 110A may receive the transmission 210 over, for example, the HS-SCCH portion (not separately shown) of the FIG. 1 link 112A. Likewise, terminal 106A may receive the transmission 210 over, for example, the HS-SCCH portion (not separately shown) of the FIG. 1 link 108A. Referring to FIG. 2, the scheduling information within transmission 210 may identify the particular terminal 106, i.e., terminal 106A, to which a transmission of a data packet will be directed. At a time subsequent to at least a portion of the scheduling information, the base station 104A sends a transmission 212 of a data packet to the terminal 106A and to the DRR 110A. Transmission 212 may be carried to the terminal 106A and to the DRR 110A over, for example, the HS-PDSCH portion (not separately shown) of links 108A and 112A, respectively. The scheduling information transmission 210 may, for example, be in accordance with an HS-SCCH transmission. The data packet transmission 212 may, for example, be in accordance with an HS-PDSCH transmission.

The amount of time delay between the scheduling transmission 210 and the data packet transmission 212, and examples of information that may be within the scheduling information of transmission 210 during the time span extending from the beginning of that transmission 210 to the start of the data packet transmission 212, are described in greater detail in later sections. As will also be described, according to one or more aspects, the scheduling information of the transmission 210 within the above-described span preceding the start of transmission 212 need include no more than the identity of the destination terminal 106.

According to one aspect, the DRR 110A may store the data packet of transmission 210 in association with the address of the destination terminal 106 to which the packet was directed. Subsequent to receiving and storing the data packet of the transmission 212 the DRR 110A, according to one aspect, waits for an acknowledgment signal from the terminal 106A. The acknowledgement signal may, or may not be an ACK/NAK type acknowledgement, in accordance with UMTS HARQ standards. In one aspect, the DRR 110A determines, from its reception or its failure of reception of the acknowledgement signal over, for example link 112B, whether or not a future transmission of a data packet from the base station 104A to the terminal 106A will be a retransmission of the data packet of transmission 212 that was stored by the DRR 110A.

Figure 3:
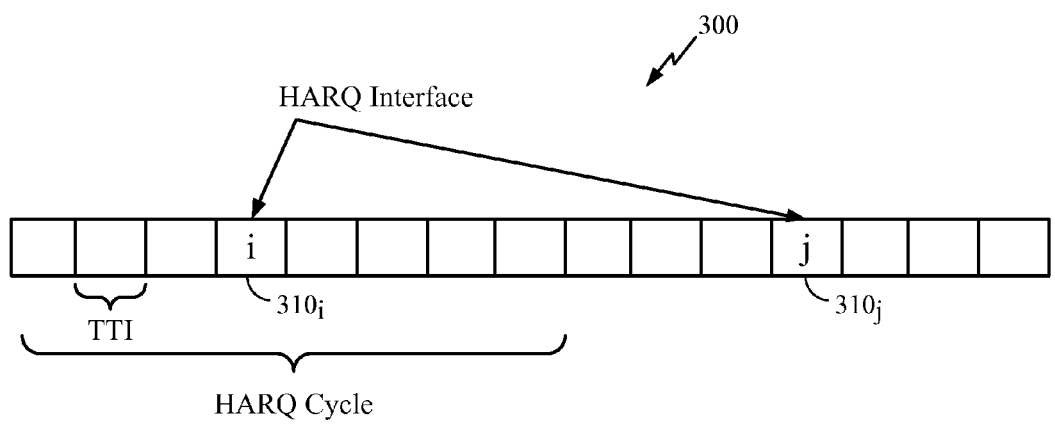
FIG. 3 shows an example HARQ interlace.

FIG. 3 is an example HARQ interlace 300 for depicting one illustrative time relation between one occurrence, within time increment (TTI) 310*i* of a scheduling information signal 210 and associated data packet signal 212 to a particular terminal 106, such as terminal 106A, and the next transmissions, at TTI 310*j*, of a scheduling information signal 210 and associated data packet signal 212 for the same interlace to that terminal 106A. The HARQ interlace 300 may be called an interlace of eight, because a particular terminal 106 such as 106A receives retransmissions of a data packet, by transmission such as 210, 212, once every eight TTIs. The DRR 110 stores the data packet sent in TTI 310*i* and, during the time span from TTI 310*i* to a given minimum time prior to TTI 310*j*, waits for the acknowledgement signal from terminal 106A to determine whether or not the packet that will be sent at TTI 310*j* will be retransmission of the data packet sent at TTI 310*i*. In one aspect, the acknowledgement signal, if sent, may have either of two values, or states, one indicating the data packet was received and decoded correctly and the other indicating the data packet was received but not decoded correctly. The two states may be, but are not necessarily, the ACK and NAK states defined in the UMTS HARQ standard. According to another aspect, the terminal 106 only sends an acknowledgement signal if the data packet is received and decoded correctly. Further according to this one aspect, failure of the base station 104, and hence failure of the DRR 110, to receive an acknowledgement signal before, for example, expiration of time-out counter starting at transmission of a data packet, is interpreted as a failure by the terminal 106 to receive or to correctly decode that data packet.

It will be understood that readily identifiable factors establish the minimum time prior to TTI 310*j* by which the DRR 110 should determine whether or not the transmission at 310*j* will be a retransmission of the data packet sent at TTI 310*i*. Such factors include the time required for the DRR 110 to retrieve the prior stored data packet from the DRR 110 storage, the time required for the DRR 110 to re-encode that data packet, if necessary, to match the encoding that the base station 104 will use for the retransmission, and the delay time of the DRR 110 radio frequency (RF) amplifier portion.

According to one aspect, the interlace period in 300 should not be less than two TTIs, as such an interlace may not provide adequate time for the DRR 110 to determine whether or not the subsequent data packet transmission will be a retransmission and, if it is so determined, to perform the necessary retrieval from storage, re-encoding, and transmission of the stored packet quickly enough to cooperate with the retransmission from the base station 104.

Figure 4:
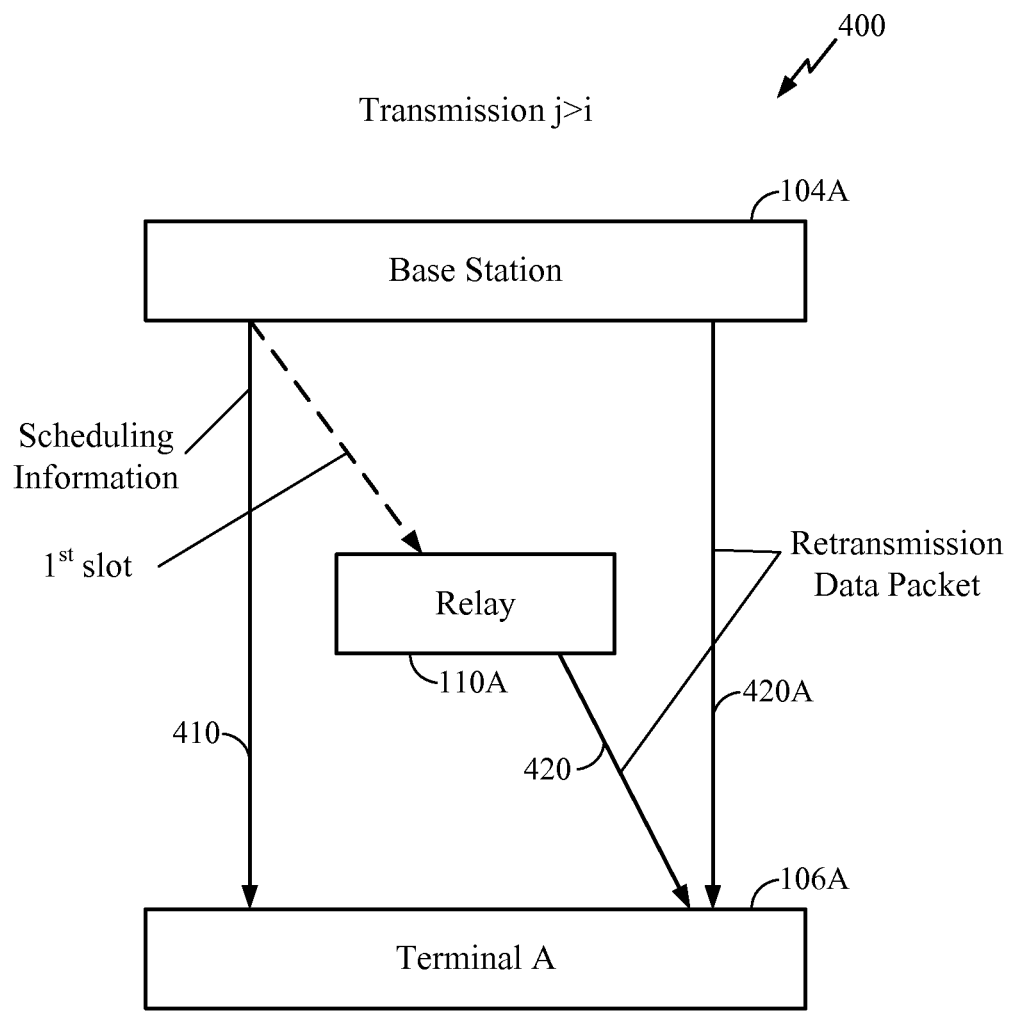
FIG. 4 is a high level schematic of a retransmission by a base station and a diversity retransmission from a diversity retransmission relay, to a terminal.

FIG. 4 illustrates one example of a cooperative retransmission operation 400 performed by the DRR 110A of the FIG. 1 system 100, at TTI 310*j* of FIG. 3 in response to receiving other than an ACK (or equivalent) from the destination terminal 106A indicating a correct reception and decoding of the data packet transmitted at the FIG. 3 TTI 310*i*. The retransmission operation 400 begins with the base station 104A transmitting a scheduling information signal 410, shown as received by the destination terminal 106A and the DRR 110A. The scheduling information signal 410 may, for example, be an HS-SCCH transmission as described in greater detail in later sections. The scheduling information signal 410 may have a first slot carrying, with or without other information, the identity of the destination terminal 106A. As will be described in greater detail in later sections, the scheduling information signal 410 may carry, after the destination terminal identification, additional information. However, as will also be described in greater detail, in one aspect the DRR 110A does not require such information other than the destination terminal 106A identifier to carry out the relay transmission 420.

Referring still to FIG. 4, as previously described the depicted retransmission operation 400 assumes the DRR 110A has determined that the next data packet of the interlace from the base station 104A to the destination terminal 106A (which would be the data packet transmitted at TTI 310*j* of the FIG. 3 example 300) will be a retransmission. The DRR 110A responds, immediately upon detecting that terminal 106A identifier, by retrieving from the DRR 110A storage its received copy of the previous data packet transmitted at the FIG. 3 TTI 310*i* from the base station 104A to that terminal 106A. The DRR 110A may, or may not re-encode that retrieved copy to match whatever coding the base station 104A applies to its retransmission and, at 420, the DRR 110A retransmits that stored data packet to the terminal 106. The DRR 110A may send the retransmission 420 at a time substantially co-incident with the retransmission 420A sent by the base station 104A. The DRR 110A retransmission 420 and the base station 104A retransmission 420A may, or may not be in accordance with an HS-PDSCH transmission.

It will be appreciated that the destination terminal 106A may be capable of receiving either the DRR 110A retransmission 420, or the base station 104 retransmission 420A, or both 420 and 420A. In one aspect, the retransmission 420 may be encoded by the DRR 110A to have the same encoding as the base station applies to the retransmission 420A. Further to this one aspect, the destination terminal 106A may receive both the DRR 110 retransmission 420 and the base station 104A retransmission 420A and, since these are identically encoded, the destination terminal 106A may combine them.

It will be readily appreciated that among the features and benefits provided by various embodiments, is that the terminal 106 with which the DRR 110 is cooperating, may receive a higher signal to noise and interference ratio (SINR) than would be received by the same terminal 106 in the same communication system 100 without the DRR 110. It will be appreciated that, further to an increased SNR, one or aspects may provide, among other various benefits, a reduction in an average number of retransmissions required to correctly receive the same data or less power from the cell. It will be further appreciated that, among other benefits, the destination terminal 106 with which the DRR 110 is cooperating may receive a larger payload for the same re-transmission statistics and power and residual block error rate (e.g. 1% error after four transmissions). As can be readily understood in view of this disclosure, these only examples, and not an exhaustive list of features and advantages provided by cooperative actions of the DRR 110, base station 104 and terminals 106 according to the disclosed embodiments.

According to one aspect, the DRR 110 cooperating with a destination terminal 106 and base station 104 may transmit to that destination terminal 106 one or more a cooperative pilots while the DRR 110 is not receiving scheduling information, e.g., HS-SCCH, or data packet information, e.g., HS-PDSCH, from the base station 104. In one aspect, the DRR 110 may transmit pilot even if it is not transmitting cooperative data packet transmissions as described above.

In one aspect the DRR 110 may transmit pilot(s) to a particular destination terminal 106 in a particular time relationship with the DRR 110 diversity retransmissions to that destination terminal 106, or a manner corresponding to the pilot(s) transmitted by the one or more base stations 104 with which the DRR 110 is cooperating. In one aspect, the DRR 110 may assign the transmissions of the pilot(s) to be intermittent, with a timing corresponding to whether the DRR 110 is receiving and storing data packets from the base station(s) 104, or transmitting diversity retransmission packets to terminals 106. The transmission may be intermittent because, according to one aspect, the DRR 110 may not concurrently receive and transmit data packets. It will also be appreciated that, by transmitting a pilot from the DRR 110, a terminal 106 receiving the pilot may determine a higher CQI for the channel over which the pilot is received, thus illustrating one of the benefits and advantages provided by one or more of the exemplary embodiments.

According to another aspect, the DRR 110 may not transmit a pilot, and the terminal 106 may continue to report a CQI based only on the signal(s) it receives from the base station 104.

According to one aspect, the DRR 110 may transmit the pilot at a power such that when received by the terminal 106 it will be stronger than the pilot the terminal 106 receives from the base station 104. In one aspect, the DRR 110 may be configured to transmit at such a power because may only transmit pilot intermittently. In another aspect the DRR 110 may be configure to transmit pilot at such a power to cooperate with the terminals 106 using a filtered measurement to determine CQI. As will be understood by a person or ordinary skill in the art from his disclosure, these aspects provide for power management such that the terminal 106 generation of CQI, based on filtering of combined pilot Ec/Io (signal to interference), reflects the diversity retransmission of data packets from the DRR 110.

According to one aspect, it may be preferable that the terminal 106 take pilot (i.e., CQI) measurements only while receiving data or, in one alternative, favor such measurement times. It will be understood that such timing of the terminal 106 making CQI measurements is not required.

Figure 5:
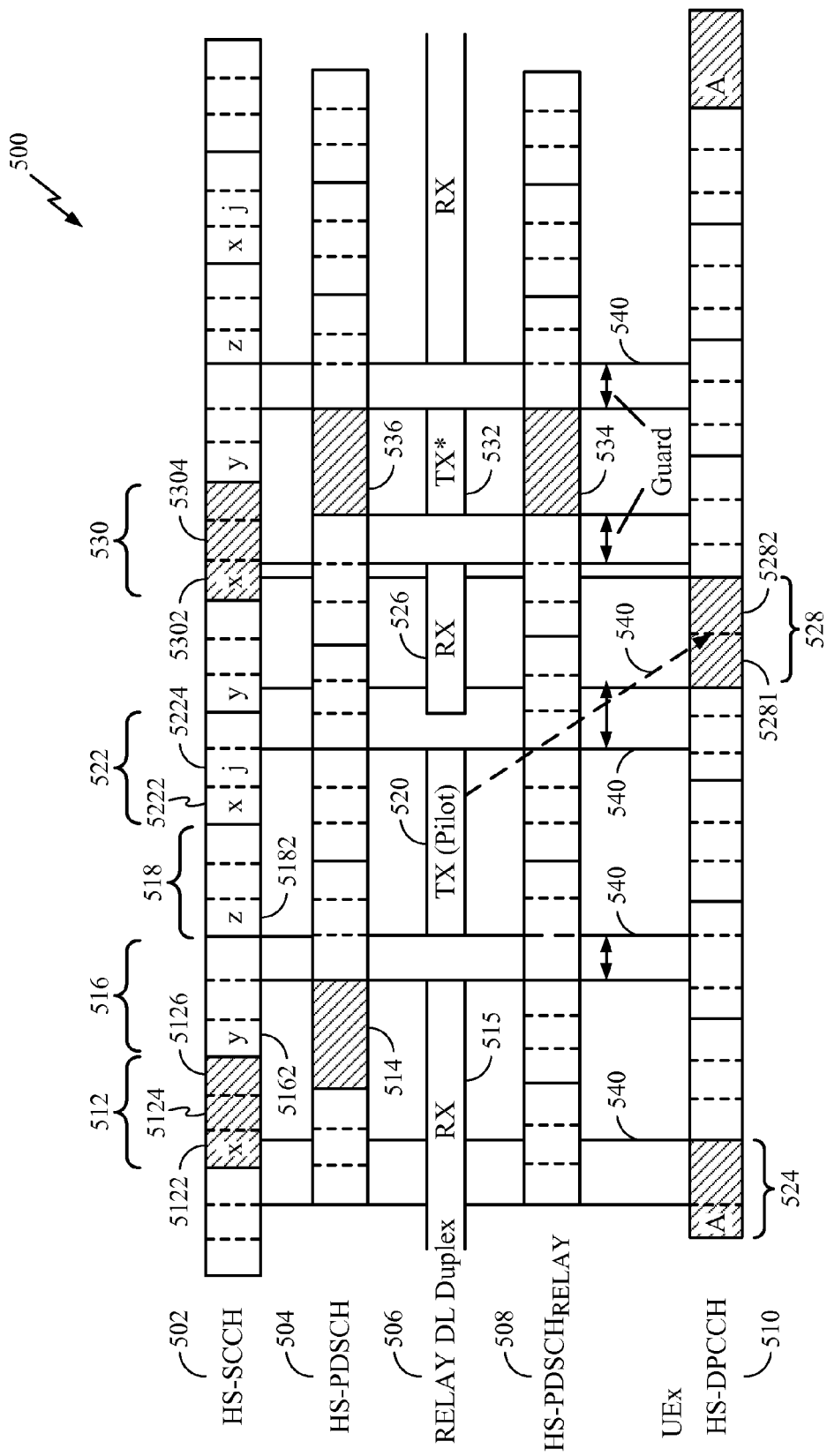
FIG. 5 is a timing diagram of one example operation of a packet receipt, storage and retransmission according to one aspect.

FIG. 5 shows one illustrative detailed timing 500 of one example of a cooperative communication according to one aspect, in a communication system 100, among the DRR 110A, the base station 104A and the destination terminal 106A. However, this is only for illustrative purposes, as cooperative action identical to the FIG. 5 example 500 may be performed by the base station 104B, DRR 110B and terminal 106B of cell 102B. Further, particular events in the illustrative timing 500 will be described in reference to an HSPA protocol, using HS-SCCH for scheduling information transmission and HS-PDSCH for data packet transmission from the base station 104A. This is not intended as any limitation on the scope of applications for the described embodiments. It will be understood that the timing 500 omits various details of the HSPA protocol not particular to the aspects illustrated by this example.

With continuing reference to the FIG. 5, the illustrative timing 500, shows one example relation of an HS-SCCH timing 502, a forward link HS-PDSCH transmission timing 504 by a base station (e.g., base station 104A), a DRR 110A duplex transmit/receive mode timing 506, a forward link HS-PDSCH transmission timing 508 by the DRR 110A to the terminal 106A, and an HS-PDSCH uplink transmission timing 510 of HSPA acknowledgement signals relative to the example HS-PDSCH transmissions represented by timing 504.

Referring still to FIG. 5, in the HS-SCCH timing 502 the base station 104A transmits HS-SCCH scheduling information signal 512 having at sub-interval, or slot 5122 the address of the particular terminal 106A, at slot 5124 the packet number, and at slot 5126 the retransmission number. In the example timing 500, the "x" within slot 5122 denotes the address of terminal 106A, x in this example being the address corresponding to the terminal 106A. The "i" within slot 5124 denotes the particular packet number, and the numeral in slot 5126 indicates the retransmission number (0, 1 . . . ). In this description of illustrative operations referencing the example timing 500, it will be assumed that the data packet frame 514, which is described in greater detail below, is a first transmission from the base station 104A of that data packet. However, in view of this disclosure, modifying the example timing 500 to reflect operations, according to one more aspects, where the data packet frame 514 is a retransmission instead of a first transmission will be readily apparent to persons of ordinary skill in the art.

With continuing reference to the FIG. 5 illustrative timing 500, the DRR 110A at the end of slot 5122 determines that the base station 104A is directing data to terminal 106A, based on the address x. The DRR 110 can make this determination because the first slot 5122 of the HS-SCCH corresponding to TTI 512 is covered with the H-RNTI (terminal address) and is decodable independent of the last two slots 5124 and 5126. According to one aspect, this terminal address information is sufficient for the DRR 110A using, for example, control circuitry and memory described in greater detail in reference to FIGS. 10A and 10B, to store the data packet frame 514. As also further described, the data packet frame 514 may be stored without first decoding that frame 514, or may be decoded and stored in an unencoded format. The first slot 5122 also carries modulation information, including identification of the HS-PDSCH (codes) and the modulation scheme. Time slots 5124 and 5126, which may be collectively referenced as the second part of the HS-SCCH, carry the data block size and ARQ parameters, e.g., the retransmission number and, if incremental HARQ is used, the incremental redundancy version.

As will be understood from this description, the DRR 110A (and the DRR 110B) does not require, and therefore is not required to wait for, this subsequent second part of the HS-SCCH information signal 512 to determine whether the associated data packet signal 514 will a retransmission. The DRR 110A has determined prior to receiving the HS-SCCH information signal 512, based on the ACK/NAK or equivalent 524, that the DRR 110A received from the destination terminal 106A indicating that the destination terminal 106A received and correctly decoded the previous HS-PDSCH data packet (not shown in FIG. 5) sent from the base station 104A to that destination terminal 106A. However, the incremental redundancy version should be unchanged from the prior (first)

transmission or evident from the cell's HARQ parameter pattern which the DRR 110 can learn from observation. The retransmission number can be deduced from the terminal 106 acknowledgment (ACK), negative acknowledgment (NAK) or lack thereof. In other words, if the terminal 106A does not receive the earlier transmission, it may send DTX or if it does detect it but incorrectly decodes, then with NAK. Thus, the base station 104A will increment the retransmission number. In cases where the base station 104A transmits the same encoding of the packet on each transmission there is no need to distinguish retransmission number. However, the DRR 110A can still determine that it is the same packet being retransmitted rather than a new packet. The DRR 110A is able to do so by receiving, for example, terminal 106 HS-DPCCH ACK/NAK transmissions on the reverse link (uplink, or "UL") independently of the downlink receive (RX) or transmit (TX) mode.

Continuing to refer to the FIG. 5 example timing 500, the base station 104A transmits data packet 514 in the HS-PDSCH data packet time line 504 corresponding to the HS-SCCH scheduling information signal 512, and the data packet 415 begins after slot 5122 of that information signal 512, prior to slot 5126 which has the retransmission number. As previously described, though, according to one aspect of one or more of the exemplary embodiments, the DRR 110A will not need the retransmission number at slot 5126. This is a significant feature, because the retransmission number at slot 5126, although transmitted after the corresponding HS-SCCH TTI 5122, overlaps the data packet 514. This feature is illustrated by the DRR 110A, being in its receive mode 515 of the DL duplex timing 506, receiving and storing the entire data packet 514, notwithstanding the data packet 514 commencing prior to the end of the HS-SCCH scheduling information signal 512.

With continuing reference to FIG. 5, the HS-SCCH scheduling information signal 516 of the example timing 502, following the above-described scheduling information signal 512, has a "y" in its first slot 5162. It will be assumed for this example that "y" is an address of a terminal 106 different from the terminal 106A. It will also be assumed that the DRR 110A is not cooperating with the terminal 106 identified by "y" in the first slot of the HS-SCCH scheduling information signal. Therefore, under these assumptions, the DRR 110A, after decoding the "y" content in slot 5162, will not configure itself to receive the HS-PDSCH data packet (not shown) corresponding to the HS-SCCH scheduling information signal 516. Instead, the DRR 110A, at an example period such as 520 within the DRR 110A duplex timing 506, switches to a transmit mode and transmits pilot signals. Illustrative examples of relative timing and frequency of DRR 110A pilot signal transmission, and aspects using relative power of such transmissions, are described in greater detail at various sections of this description. The DRR 110A then receives another HS-SCCH scheduling information signal 518, having a "z" terminal in its address field 5182. The DRR 110A therefore continues in the transmit mode 520.

Referring still to FIG. 5, while the DRR 110A is still in the transmit mode 520, the DRR 110A receives an HS-SCCH scheduling information signal 522 having "x" in its first slot 5222. The packet number at the second slot 5224, however, is "j." The DRR 110A therefore does not receive and store the HS-PDSCH data packet associated with the HS-SCCH transmission at TTI 522, because it is assumed configured, in this example 500, to cooperate only with packets transmitted with an HS-SCCH interlace period of six. At period 526 of the DRR 110A duplex mode timing 506, the DRR 110A changes to a receive mode. During the receive period 526 the DRR 110A receives an HS-DPCCH packet 528 within the timing 508, through, for example, the HS-DPCCH uplink (not separately numbered) of the link 112B, shown at FIG. 1 between the destination terminal 106A and DRR 110 link 112B. In the FIG. 5 example 500, the HS-DPCCH packet 528 includes three slots, the first labeled 5281, and the second and third collectively labeled 5282. Slot 5281 has an ACK/NAK response from the destination terminal 106A, the response corresponding to the HS-PDSCH data packet frame 512. Slots 5282 have a CQI value which, as indicated by the flow line 510, reflect the destination terminal 106A having measured a signal power (and hence channel quality) not only from pilots (not shown on FIG. 5) transmitted by the base station 104A, but also from the DRR 110A pilot transmission 520. It will be understood that the pilot transmission 520, and its result shown by flow line 510, is a feature according to one aspect, and may be omitted.

With continuing reference to FIG. 5, in the example 500 the ACK/NAK value in slot 5281 of the HS-DPCCH transmission 528 is an "N," which in this depicted example represents a NAK signal. This is an indicator that the destination terminal 106A received the HS-PDSCH data packet frame 512, the decoding result was in error. The DRR 110A according to one or more embodiments therefore knows that the next HS-PDSCH transmission for the "i" packet stream from the base station 104A to the destination terminal will be a retransmission of the data packet sent in frame 514. As described in greater detail in later sections, this detection function may be performed by, for example, one or more programmable computers and one or more sets of computer readable instructions stored in a memory of the system hardware implementation of the DRR 110A. Referring still to the FIG. 5 illustrative the timing 500, the DRR 110A then receives an HS-SCCH information signal 530 having "x" in the first slot 5302 and the packet number in the second slot 5304. In response, the DRR 110A retrieves from its storage the previously stored HS-PDSCH data packet 514, and then may or may not re-encode the retrieved data packet.

Continuing with the FIG. 5 example 500, at the start of time period 532 of the DRR 110 duplex timing, the DRR 110A switches the duplex mode to transmit and transmits, to the destination terminal 106A, a retransmission HS-PDSCH data packet 534. This retransmission is substantially concurrent with the base station 104A retransmission HS-PDSCH data packet 536. Since the data packet 534 is the same data (with the same or with a different encoding) as the previous "i" data packet, which the DRR 110A retrieved from storage, the DRR 110A retransmission HS-PDSCH data packet 534 is a diversity retransmission of the base station 104A retransmission data packet 514. The destination terminal 106A therefore, depending on the channel quality between the base station 104A and the destination terminal 106A, and the channel quality between the DRR 110A and the destination terminal 106A, receives the HS-PDSCH from the base station 104A or from the DRR 110A, or both. In the FIG. 5 example 500 the destination terminal 106A successfully decodes one or both of the base station 104A retransmission data packet 536 or the DRR 110A retransmission data packet 532, and responds with an "A" in slot 5281 of HS-SCCH transmission 528.

It will be understood that the DRR 110 may cooperate with the base station 104 to assist multiple users, e.g., multiple terminals 106, who are scheduled simultaneously by the cell (i.e. in the same slots/TTIs/HARQ interlaces). However, the DRR 110 may also cooperate with the base station 104 to assist multiple users who are scheduled in different TTIs/HARQ interlaces as long as the interlaces are non-adjacent or the timing for FDD operation does not overlap (e.g., to allow for receiving part of the HS-SCCH). In other words, to serve multiple users that do not use the same interlaces, the relay may select a set of one or more users to serve such that the time periods the relay would have to receive on a given channel (frequency) do not overlap time periods that the relay would have to transmit on the same channel (frequency) and vice versa. In another embodiment, this may be subject to the further restriction that transmit and receive time periods be separated by a time margin (guard time) to allow for switching, and illustrative examples of such guard times are generically labeled as 540.

Further, it will be understood that the DRR 110 may spend more time transmitting if the target number of transmissions is larger than two (e.g. four), but the DRR 110 will need to periodically return to longer receive durations to receive new first transmissions. According to one aspect, the DRR 110 may select users, e.g., terminals 106, to aid based on the convenience of their HARQ interlaces for the DRR 110 duplex (switching) timing or to maximize the number of users it can assist.

For consistency in labeling, the timing of DRR 110 transmission on the HS-PDSCH channel in relation to DRR 110 reception from the HS-PDSCH channel will be referenced hereinafter as the "DRR 110 DL Duplex" or "DRR DL Duplex scheme." The timing of DRR 110 transmission on the HS-DPCCH channel relative to DRR 110 reception from that HS-DPCCH will be referenced hereinafter as "DRR 110 UL Duplex" of "DRR 110 Duplex scheme." Referring to the FIG. 1 example communication system 100, the DRR 110A UL Duplex scheme may be carried over, for example, the uplink (e.g., HS-DPCCH channel) portions of 112A and 112B, and the DRR 110A DL Duplex scheme may be carried over, for example, the downlink (e.g., HS-PDSCH channel) portion of link 112A and 112B. Similarly in the example communication system 100, the DRR 110B UL Duplex scheme may be carried over, for example, the uplink (e.g., HS-DPCCH channel) portions of 114A and 114B, and the DRR 110B DL Duplex scheme may be carried over, for example, the downlink (e.g., HS-PDSCH channel) portion of link 114A and 114B.

Figure 6:
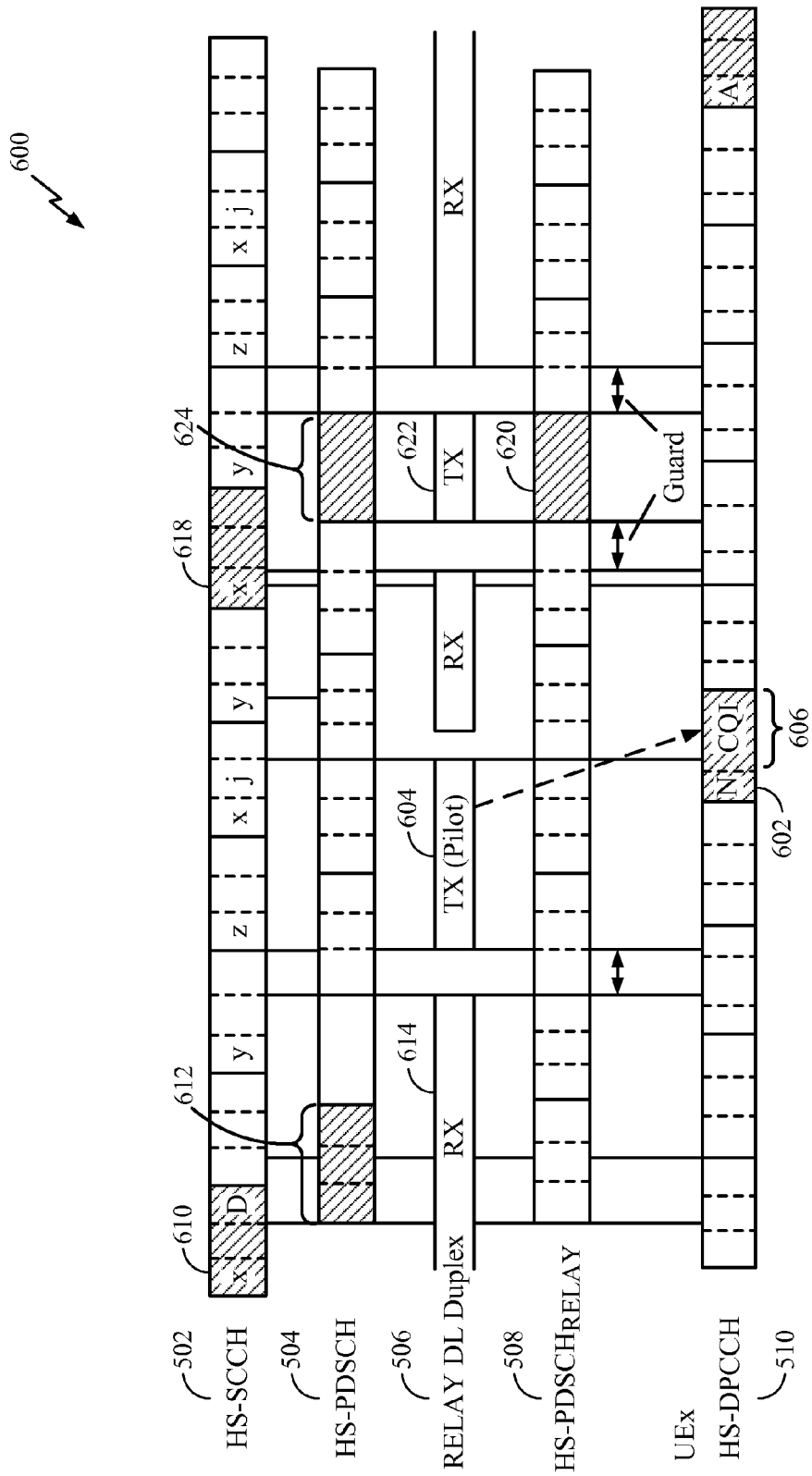
FIG. 6 is a timing diagram of one example operation of a packet receipt, storage and retransmission, and pilot transmission according to one aspect.

Referring to the FIG. 6 example timing 600, it will be understood that it is not necessary to coordinate the DRR 110 UL Duplex scheme with the DRR 110DL Duplex scheme. For example, as can be seen from FIG. 6, the DRR 110 may observe the terminal 106 NAK slot 602 on the DRR 110 to terminal 106 uplink (e.g., the uplink portion of link 112B or 114B) while transmitting a pilot for a period 604 on the downlink (e.g., the downlink portion of the link 112B or 114B). Further, according to one aspect, as shown in the FIG. 6 example timing 600 the DRR 110 may transmit pilot (even if the DRR 110 has no data to send) for a period 604 prior to the terminal 106 CQI report at 606.

Among the various features, benefits and advantages of a timing according to the FIG. 6 example 600, is that the terminal 106 may take into account the effective increase in channel quality that results from the DRR 110 diversity retransmission, i.e., the DRR 110 providing a second, concurrent signal source that retransmits data packets to the terminal 106. Therefore, from the terminal 106 point of view the effective channel quality, at least for retransmissions, is higher than the channel quality of the link between the terminal 106 and the base station 104 standing alone. According to one aspect, a communication system or method according to one or more exemplary embodiments may exploit this increased effective channel capacity by having the terminal 106 report—a higher CQI at 606 than the signal power from the base station 104 would generate alone. The base station 104, receiving this higher CQI, may then schedule the terminal 106 that reported the higher CQI in the subsequent HS-SCCH/HS-PDSCH TTI with a larger MAC frame, i.e., more data than it otherwise could transmit successfully to the terminal 106 without the DRR 110. It will be understood that, according to one or more aspects, the base station 104 cooperates with the HS-PDSCH transmission and the terminal 106 successfully receives the large data frame.

It will be understood that the example scheme and timing 600 depicted at FIG. 6 does not, in the depicted operation according to one aspect, include relaying of the one acknowledgment (e.g., ACK/NAKs) 602 from the terminal 106 (i.e. relaying of the HS-DPCCH). It will be appreciated, though, that it is not a disadvantage that the terminal 106 ACK/NAK (HS-DPCCH) is not relayed. One reason is that the DRR 110 cannot simultaneously transmit either ACK or NAK with the terminal 106 without knowing what occurred at the terminal 106 in advance. However, in the worst case, this merely means that the effective downlink to the terminal 106 may not benefit as much as otherwise may be obtained. Furthermore, if the power delta(s) for the HS-DPCCH are set conservatively, it may not be a limiting factor and these can be compensated/adjusted if desired. It will be understood that this is one example of how infrastructure may be tuned to gain further benefits from the DRR 110 diversity retransmission relays according to various exemplary embodiments, and it will be understood that in this illustrative example tuning is not required.

The FIG. 6 example 600 shows another illustrative cooperation of the DRR 110 with the terminal 106 and base station 104, to provide a diversity retransmission from the DRR 110 of a data packet to the terminal 106. Referring to the example 600, it is assumed that the "x" address transmitted by the base station 104 at slot 610 of the HS-SCCH timeline 502 is a scheduling for a first transmission of a data packet, which is transmitted by the base station 104 during 612 on the HS-PDSCH timeline 504. The DRR 110, being in the DL Duplex receive mode during period 614, receives and stores the data packet sent during 612. The DRR 110 then, at a given time delay after the data packet sent during 612, receives the ACK/NAK value of "N" in slot 602 of the HS-DPCCH timeline 510. The DRR 110 determines, from that "N" value, that the next data packet transmission to the terminal 106 identified by "x," (at the interlace of five shown in the example,) will be a retransmission of the 612 data packet it earlier received. Therefore, the DRR 110 responds to the "x" in slot 618 of the HS-SCCH transmission from the base station 104 by retrieving the stored 612 data packet, re-encoding it if necessary and, during its DL Duplex transmit period 622, retransmitting the retrieved (and optionally re-encoded) data packet 612 to the terminal 106, as HS-PDSCH packet 620. The DRR 110 retransmitting of the HS-PDSCH packet 620 is concurrent with the base station 104 retransmission during 624. It will be understood that the above-described operations of the DRR 110 may be performed by, for example, an internal processor/controller as described in greater detail at later section.

Another aspect may provide, at least in some applications and uses, a lower likelihood of looking to a tuning of an infrastructure for better obtaining certain benefits.

Figure 7:
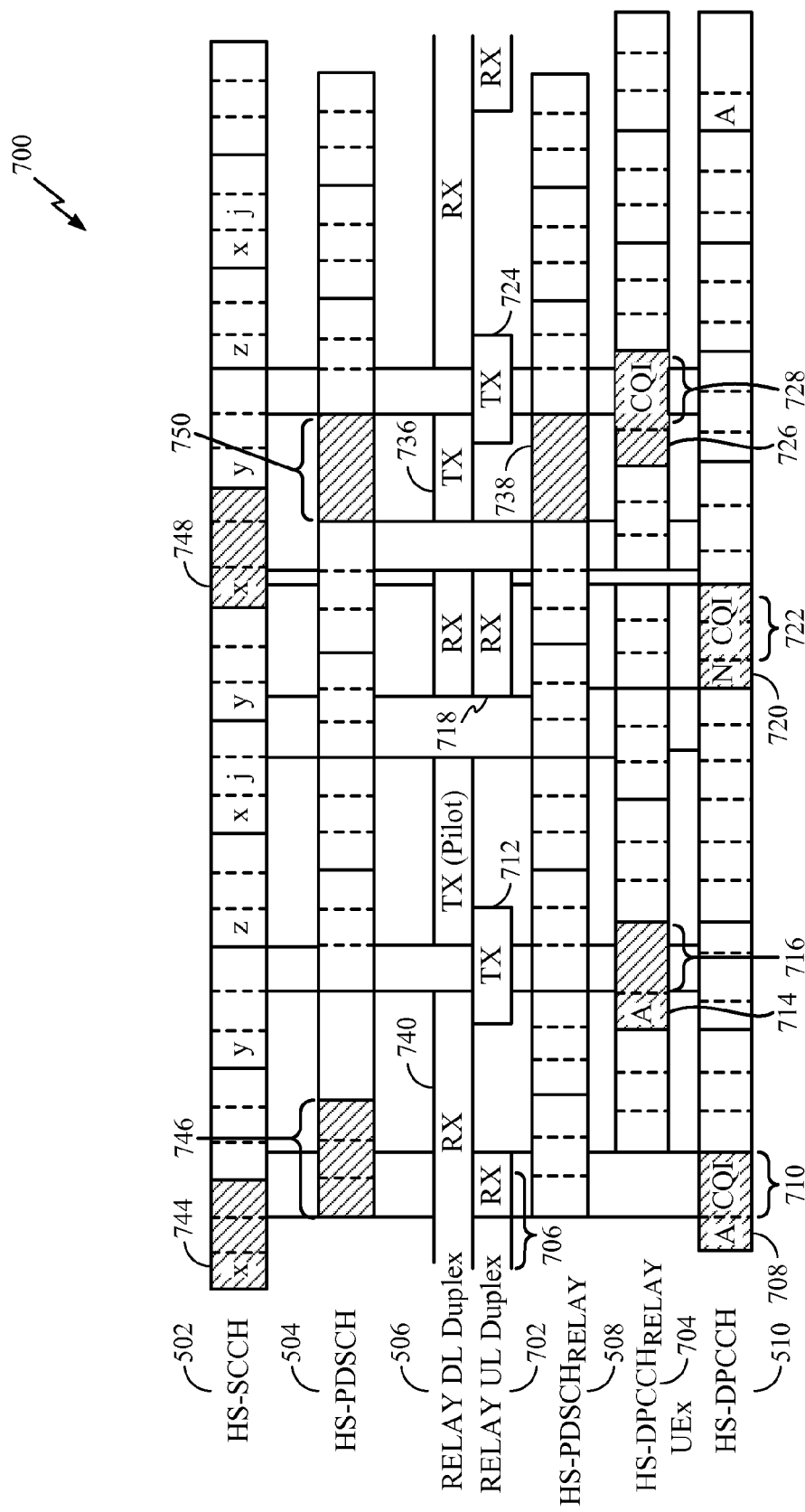
FIG. 7 is a timing diagram is a timing diagram of one example operation of a packet receipt, storage and retransmission, and pilot transmission, according to another aspect.

FIG. 7 shows one example 700 of one illustrative DRR 110 UL Duplex scheme, relative to one illustrative DRR 110 DL Duplex scheme according to one aspect. In the example 700 the DRR 110 UL Duplex scheme is represented as time line 702. The associated DRR 110 HS-DPCCH transmissions are shown on time line 704. As will be understood, according to one aspect, a timing such as the example 700 may further provide an overlap in RX modes on the link from the DRR 110 to the base station 104 and TX modes on the link from the DRR 110 to the terminal 104, and vice versa, if sufficient isolation is included. According to one aspect, enhancements to the DL feedback from the terminal 106 UL may also be provided. According to one aspect, the DRR 110 may receive a CQI report transmitted from the terminal 106 to the base station, modify this CQI report and transmit the modified CQI to the base station 104.

Referring to FIG. 7, a specific example is shown where the DRR 110 is in a HS-DPCCH receive mode through period 706, in which it receives an ACK/NAK signal 708 and a CQI report 710 from the terminal 106. The DRR 110, according to one aspect, modifies the CQI report 710, then switches to an HS-DPCCH transmit mode 712 and, at 714 repeats the terminal 106 ACK or NAK 708, but optionally may modify the terminal 106 CQI report 710 and then at 716 transmit the modified CQI report to the base station 104. This may be done with or without transmission of the pilot by the DRR 110. In other words, the DRR 110 may achieve the same or similar effect of boosting CQI that the pilot cooperation achieves without that pilot cooperation by simply modifying the CQI reported to the base station 104.

The FIG. 7 example 700 shows another illustrative sequence of the DRR 110 cooperating with the terminal 106 and base station 104, wherein during 718 the DRR 110 receives the terminal 106 ACK/NAK 720 and CQI report 722, optionally modifies the CQI report 722, switches at 724 to the HS-DPCCH transmit mode, repeats at 726 the ACK/NAK it received at 720 and, at 728, transmits to the base station 104 the optionally modified CQI report 722. It will be understood that practice according to this aspect may either require a minor modification or reconfiguration of the HS-DPCCH timing from the terminal 106 (e.g., the CQI from the terminal 106 being advanced in time so that the DRR 110 can forward it on time for the base station 104). In one alternative aspect a modification to the base station 104 (e.g., NodeB) HS-DPCCH receive processing may be readily applied by a person of ordinary skill in the art, in view of this disclosure, so that a DRR 110 may provide the modify and repeat of terminal 106 CQI reports, without necessarily requiring modification to the terminal 106 (i.e., to support legacy terminals 106).

The FIG. 7 example 700 also shows a subsequent occurrence of the above-described DRR 110 repeating of a terminal 106 ACK/NAK and CQI. The subsequent occurrence starts with the DRR 110, while in the receive period 720 of its UL Duplex timeline 702, receiving an ACK/NAK value of "N" and a CQI sent by the terminal 106 at 722 and 724, respectively, of the terminal HS-DPCCH timeline 510. The DRR 110 then switches, at the start of 724 within the DRR 110 UL Duplex mode timeline 702, to a transmit mode. During the transmit period 724 the DRR 110 transmits, at 726 and 728, respectively, of the DRR 110 HS-DPCCH timeline 704, a repeated copy of the "N" received at 720 and an optionally modified version of the terminal 106 CQI received by the DRR 110 at 722.

The FIG. 7 example 700 also shows another illustrative cooperation of the DRR 110 with the terminal 106 and base station 104, to provide a diversity retransmission from the DRR 110 of a data packet to the terminal 106. Referring to the example 700, it is assumed that the "x" address transmitted by the base station 104 at slot 744 of the HS-SCCH timeline 502 is a scheduling for a first transmission of a data packet, which is transmitted by the base station 104 during 746 on the HS-PDSCH timeline 504. The DRR 110, being in the DL Duplex receive mode during period 740, receives and stores the data packet sent during 746. The DRR 110 then, in its UL Duplex mode of receive during time period 720, receives from the terminal 106, at a given time delay after the data packet sent during 746, the ACK/NAK value of "N" in slot 720 of the HS-DPCCH timeline 510. The DRR 110 determines, from that "N" value, that the next data packet transmission to the terminal 106 identified by "x," (at the interlace of five shown in the example,) will be a retransmission of the 746 data packet it earlier received. Therefore, the DRR 110 responds to the "x" in slot 748 of the HS-SCCH transmission from the base station 104 by retrieving the stored 746 data packet, re-encoding it if necessary and, during its DL Duplex transmit period 736 retransmitting it to the terminal 106, as HS-PDSCH packet 738. The DRR 110 retransmission of the HS-PDSCH packet 738 is concurrent with the base station 104 retransmission during 750. It will be understood that the above-described operations of the DRR 110 may be performed by, for example, an internal processor/controller as described in greater detail at later sections.

Figure 8:
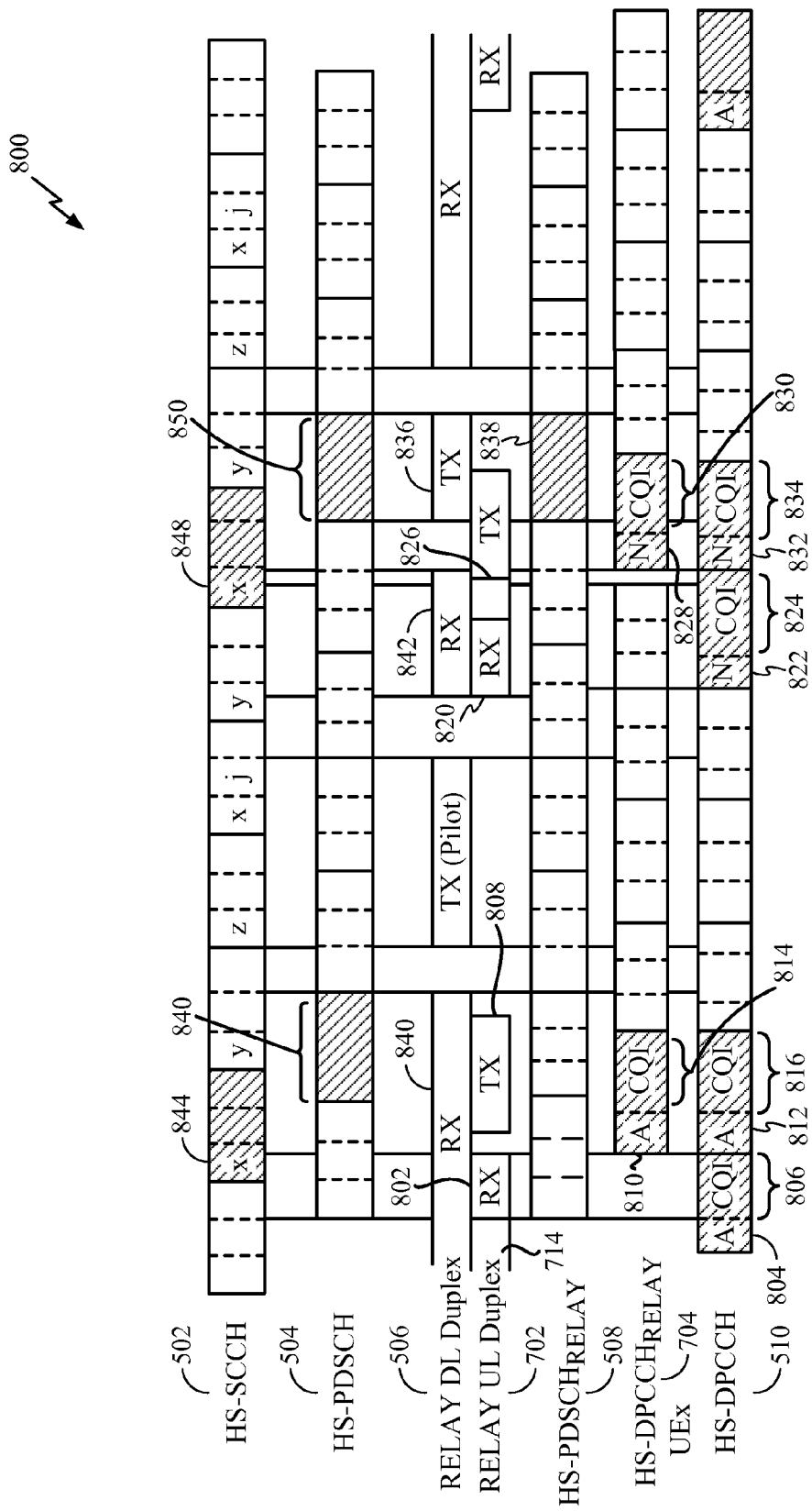
FIG. 8 is a timing diagram of one example operation of a packet receipt, storage and retransmission, and pilot transmission, according to still another aspect.

Referring to FIG. 8, in another aspect, shown by timing 800, the DRR 110 may omit decoding the terminal 106 CQI and, instead, generate its own CQI, in a manner consistent with the terminal 106 repetition of CQIs (i.e., repetition>1). Among the features and benefits provided by this one aspect is that no change may be necessary to the HS-DPCCH transmit or receive timeline or to the processing by terminal 106 or base station 104.

As shown in the FIG. 8 example 800, in one illustrative operation according to this one aspect, while in the DRR 110 UL Duplex receive period 802, the DRR 110 receives from terminal 106 a first ACK/NAK at 804 of the terminal 106 HS-DPCCH timeline 510 and, optionally, receives a first terminal 106 CQI at 806 of that timeline 510, switches to UL Duplex transmit mode at 808 then cooperates at 810 with the terminal 106 ACK/NAK repetition at 812, thereby improving the likelihood of correct reception by the base station 104. However, the CQI the DRR 110 transmits at 814 may differ from the CQI report the terminal 106 transmits at 816. If the DRR 110 CQI transmission at 814 is received by the base station 104, instead of the terminal 106 CQI transmission 816, the DRR 110 CQI effectively overrides the terminal 106 CQI. The DRR 110 may, in effect, control the downlink CQI report for that terminal 106. However, this may require that the DRR 110 be arranged to transmit its HS-DPCCH CQI with sufficient power to overpower the UEs CQI transmission. According to one aspect, the base station 104, the DRR 110 may be arranged to transmit the CQI at 814 to be received at the base station 104 at a power higher than the power of the terminal 106 CQI 816. Although the DRR 110 CQI may have a higher power at the base station 104 than the terminal 106 CQI, the DRR 110 CQI may not fully overpower the terminal 106 CQI, the base station 104 may, according to one aspect, be configured to detect both transmissions and to use only the larger one, i.e., the CQI of the DRR 110.

For purposes of illustration, the FIG. 8 example 800 shows another of the above-described DRR repeating of a terminal 106 ACK/NAK and CQI, starting with the DRR 110, while in the receive period 820 of its UL Duplex timeline 702, receiving an ACK/NAK value of "N" and a CQI sent by the terminal 106 at 822 and 824, respectively, of the terminal HS-DPCCH timeline 510. The DRR 110 then switches at the start of 826 within the DRR 110 UL Duplex mode timeline 702 to a transmit mode, during which it transmits, at 828 and 830, respectively, of DRR 110 HS-DPCCH timeline 704, a repeated copy of the "N" received at 822 and an optionally independently calculated CQI. As shown, the DRR 110 HS-DPCCH transmissions at 828 and 830 may be substantially aligned in time with the terminal 106 HS-DPCCH transmissions of "N" at 832 and "CQI" at 834, respectively.

The FIG. 8 example 800, in addition, shows another illustrative cooperation of the DRR 110 with the terminal 106 and base station 104, to provide a diversity retransmission from the DRR 110 of a data packet to the terminal 106. Referring to the example 800, it is assumed that the "x" address transmitted by the base station 104 at slot 844 of the HS-SCCH timeline 502 is a scheduling for a first transmission of a data packet, which is transmitted by the base station 104 during 846 on the HS-PDSCH timeline 504. The DRR 110, being in the DL Duplex mode of receive during period 840, receives and stores the data packet sent during 804. The DRR 110 then, in its UL Duplex mode of receive during time period 820 receives from the terminal 106, at a given time delay after the data packet sent during 804, the ACK/NAK value of "N" in slot 822 of the HS-DPCCH timeline 510. The DRR 110 determines, from that "N" value that the next data packet transmission to the terminal 106 identified by "x," (at the interlace of five shown in the example), will be a retransmission of the 840 data packet it earlier received. Therefore, the DRR 110 responds to the "x" in slot 848 of the HS-SCCH transmission from the base station 104 by retrieving the stored 840 data packet, re-encoding it if necessary and, during its DL Duplex transmit period 836 retransmits to the terminal 106, as HS-PDSCH data packet 838, the retrieved 840 data packet, concurrent with the base station retransmission during 850. It will be understood that the above-described operations of the DRR 110 may be performed by, for example, an internal processor/controller as described in greater detail at later section.

Also illustrated in the FIG. 8, the DRR 110 UL Duplex scheme and the DRR 110 DL Duplex scheme may, according to one aspect, operate independently of one another. For example, during the receive period 840 of the DRR 110 DL Duplex timeline 506, the DRR 110 UL Duplex timeline 702 shows a receive mode, at period 802, and a transmit mode at period 808. Similarly, receive period 842 and transmit period 836 of the DRR 110 DL Duplex timeline 506 differ, respectively, from the receive period 820 and transmit period 826 of the DRR 110 UL Duplex timeline 702.

Figure 9:
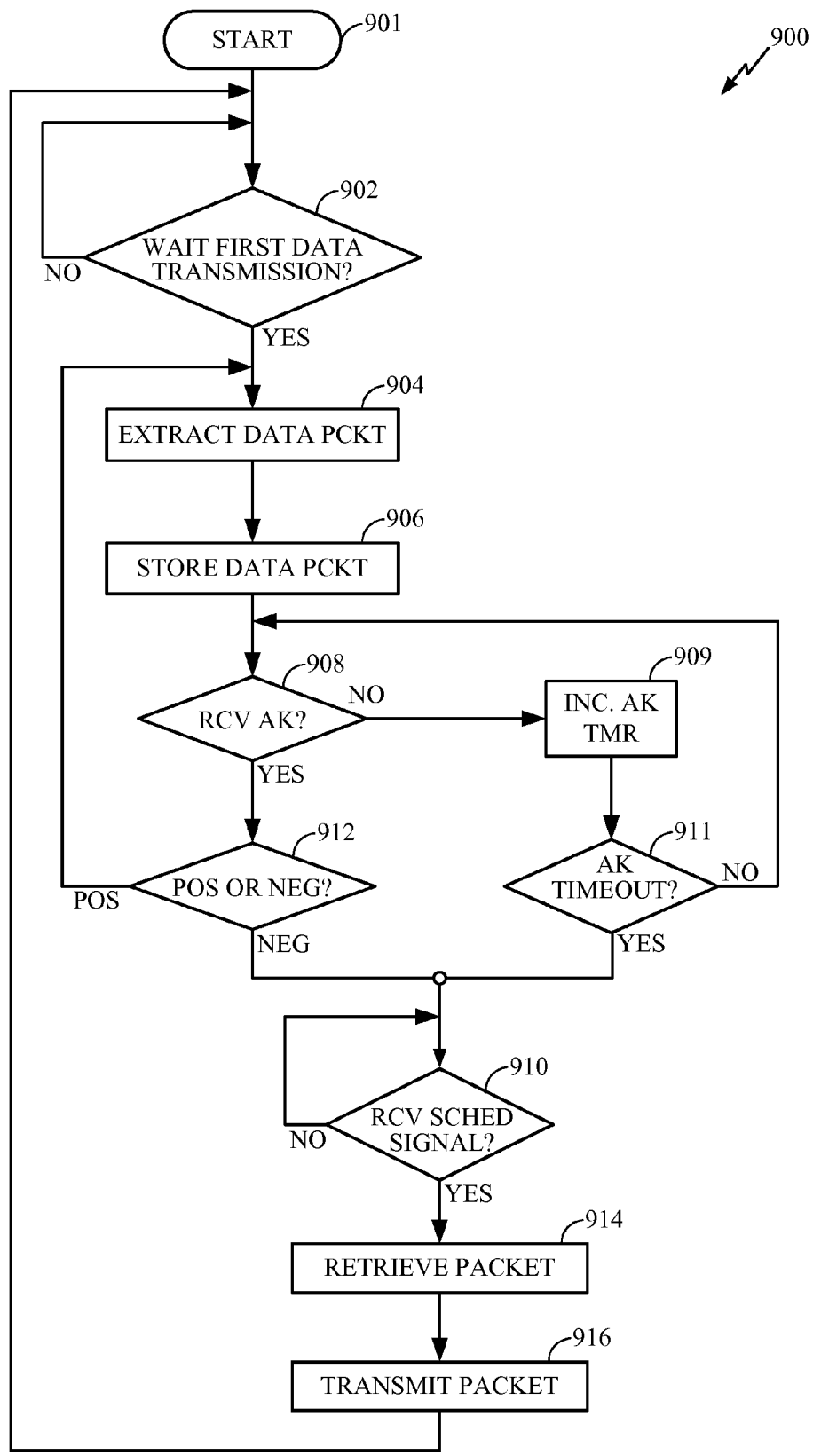
FIG. 9 is a method flow diagram of diversity relay operation according to one aspect.

FIG. 9 shows one example operation 900 for performing a diversity retransmission according to one or more aspects of one or more exemplary embodiments. Operation 900 starts at 901, and goes to 902 where a diversity retransmission relay, e.g., DRR 110, waits for a first transmission of a data packet signal from a base station to a terminal, such as from the base station 104A to the terminal 106A in the FIG. 1 communication system 100. Upon receipt of the first transmission the operation goes to 904 where it extracts a data packet associated with the transmission and then to 906 where it stores the data packet. At 908 the diversity relay waits for an acknowledgement signal from the destination terminal responding to the first transmission. A timer is incremented during the wait, at 909, and if a timeout AT expires at 911 the operation determines that the destination terminal 106 did not receive the first transmission. The operation 900 then determines that the next transmission of a data packet to the destination terminal 106 will be a retransmission of the data packet of the first transmission. If this determination is made, the operation goes to 910 to start the diversity retransmission. If, however, at 908 an acknowledgement signal is received before the time AT expires, the operation 900 goes to 912 to determine whether the acknowledgement signal was a positive response or a negative response. Positive, in this example, may mean the destination terminal received and correctly decoded the packet associated with the first transmission. Negative may mean the destination transmitter received the first transmission but the decoding was in error. If the response is positive the operation returns to 904, extracts the packet, and then to 906 to store the extracted packet as another first transmission of a data packet. If 912 determines the response is negative the operation 900 determines that, since there was a decoding error, the next transmission of a data packet to the destination terminal will be a retransmission of the data packet of the first transmission and, therefore, goes to 910 to start the diversity retransmission.

With continuing reference to FIG. 9, at 910 the diversity relay waits for an initial portion of a scheduling information signal, the initial portion identifying the same destination terminal for which the negative or absent acknowledgment signal indicated a retransmission would be required. As previously described in association with one or more aspects, the initial portion precedes the corresponding transmission of a data packet signal. If the diversity relay receives a scheduling information signal having this initial portion the operation goes to 914 to retrieve the stored data packet of the first transmission and then to 916 to transmit the retrieved packet.

According to one aspect, the retrieving at 914 may include encoding the retrieved data packet according to a new coding, which is given to the diversity relay, or which the operation derives from observing a redundancy pattern in the data packet transmissions and retransmissions preceding the retrieval, or which the operation derives from information within the scheduling information signal received prior to the retrieval. If such encoding is performed, the transmission at 916 may transmit the encoded data packet.

According to another aspect, the storing the data packet of the first transmission at 906 may include decoding the data packet into a decoded data packet, according to a given coding scheme, and storing the decoded data packet. Further to this aspect, the retrieving at 914 of the stored (decoded) data packet of the first transmission may include re-encoding the retrieved (decoded) data packet into an encoded data packet, according to the given coding scheme, and the transmitting at 916 may transmit the re-encoded data packet to the destination terminal.

In accordance with some aspects, DRR 110 may include a processor that may be coupled to memory, the memory being local or remote to the processor, or both, and the processor may be configured to execute instructions retained in memory. Memory can retain instructions related to utilizing base station protocols to communicate as a base station to a served mobile device, such as for re-transmitting a packet according to a HARQ packet repeat concurrent with a base station re-transmitting the same packet, for diversity gain as described above. Memory can retain instructions related to mobile device protocols to communicate with a base station as a mobile device, such as transmitting a CQI overriding a mobile device generated CQI, as described above. Memory can also retain instructions related to carrying data transparently across at least one intermediary network element.

In the above description, the diversity relay was described as receiving the HS-SCCH as well as the data channel. In evolved HSPA the HS-SCCH may not be transmitted for the first transmission in order to save overhead. The terminal uses blind decoding of the data channel (HS-DSCH) for pre-determined formats. Typically, this would be small formats, such as for VoIP, where the overhead of HS-SCCH would be significant. In this case, the diversity relay may also do blind decoding for such transmissions. Moreover, when such blind decoding can be done by the relay, more time periods can be free for transmission so the relay may be able to accommodate serving more interlaces or more users.

Figure 10A:
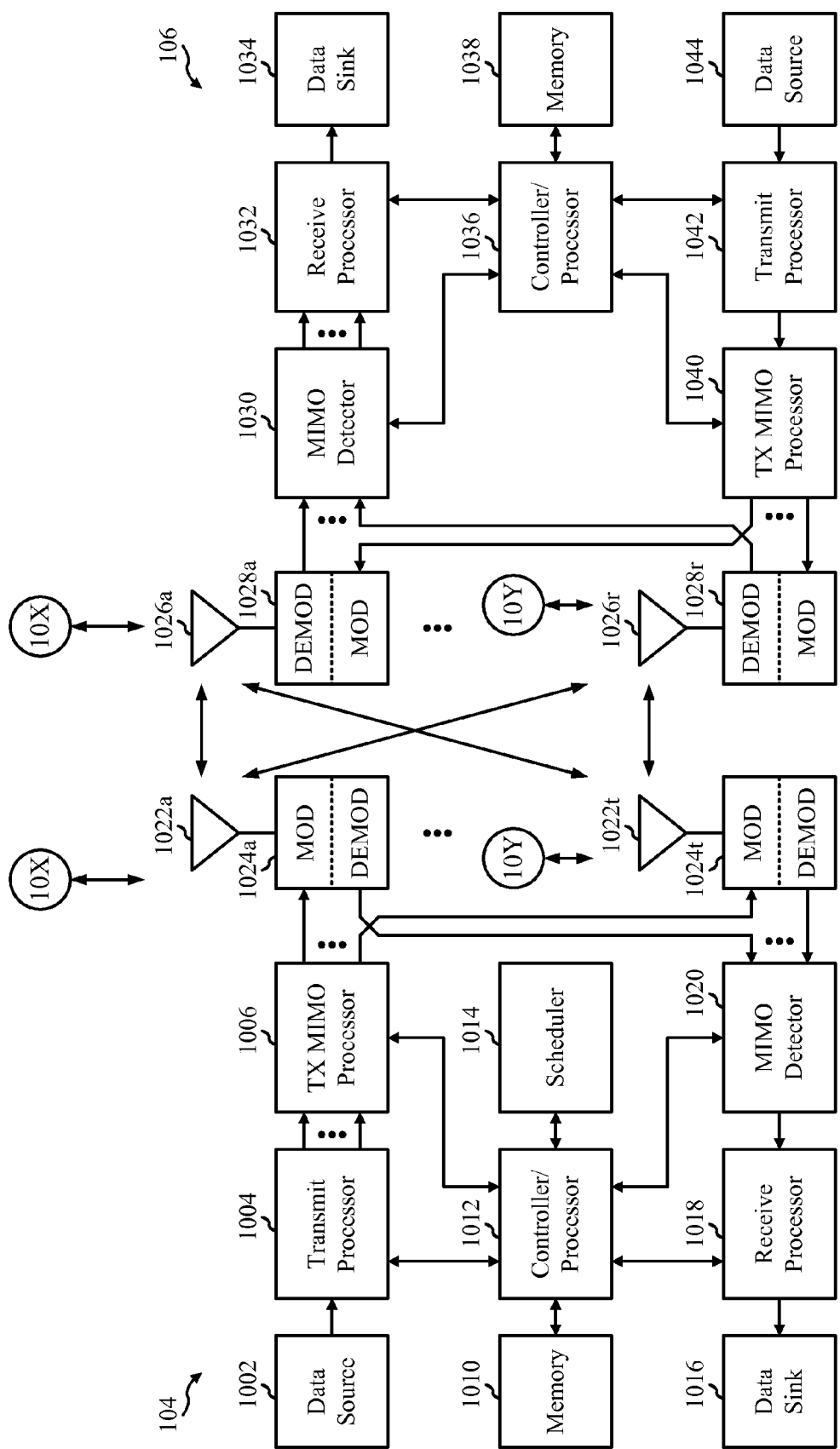
FIGS. 10A and 10B collectively show a schematic of one example base station, one example diversity relay and one example terminal.
Figure 10B:
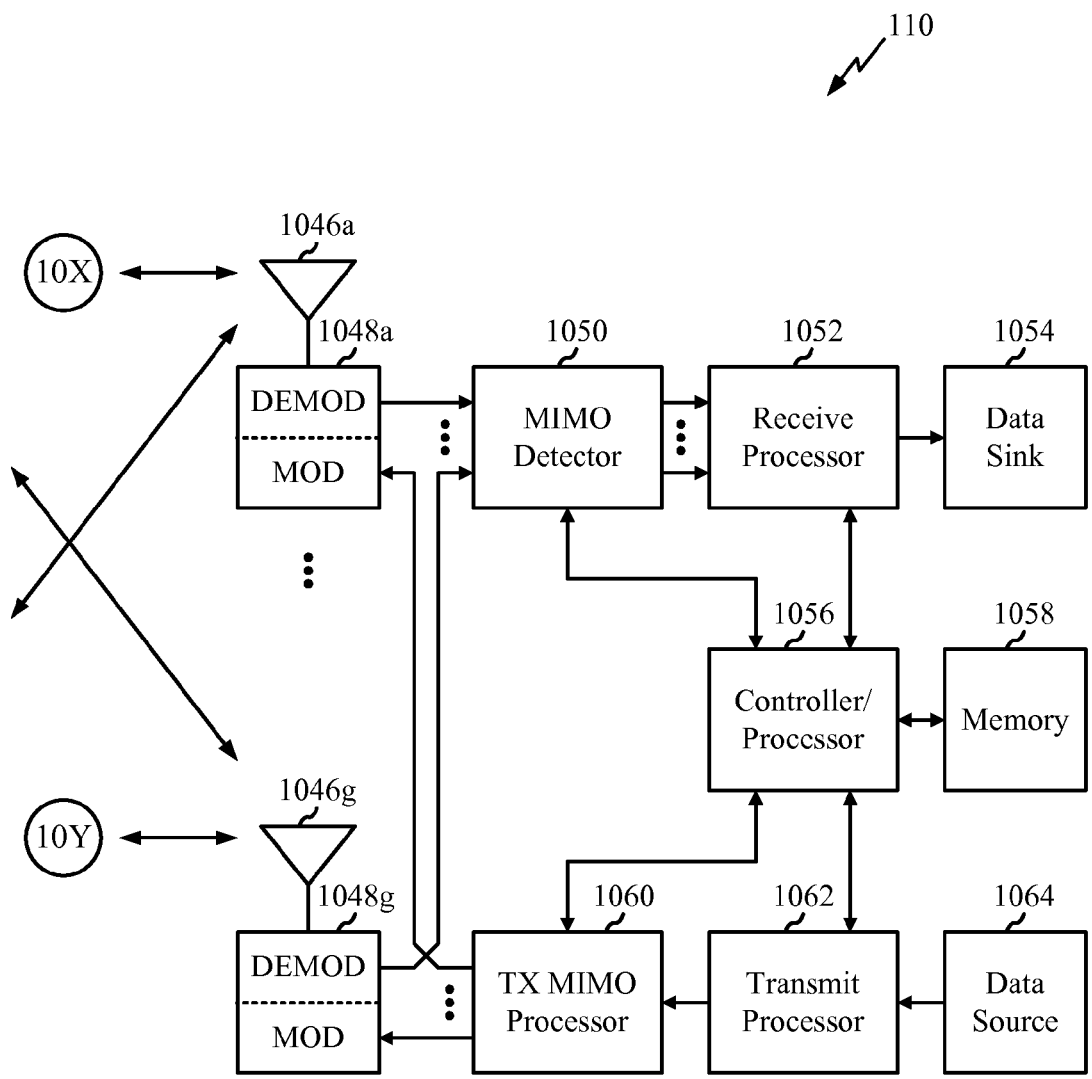

FIGS. 10A and 10B show, respectively, a block diagram of a base station 104, a terminal 106 and a DRR 110. The depicted base station 104 is equipped with T antennas 1022, labeled individually as 1022a through 1022t, terminal 106 is equipped with R antennas 1028, labeled individually as 1028a through 1028r, and DRR 110 is equipped with Q antennas 1046, labeled individually as 1046a through 1046q.

At base station 104, a transmit processor 1004 may receive packets of data from a data source 1002 and messages from a controller/processor 1012. For example, controller/processor 1012 may provide resource grants as well as messages for configuring a diversity retransmission relay such as DRR 110. Transmit processor 1004 may process (e.g., encode, interleave, and symbol map) the data packets, messages, and pilot and provide data symbols, signaling symbols, and pilot symbols, respectively. A transmit (TX) multiple-input multiple-output (MIMO) processor 1006 may perform spatial processing (e.g., preceding) on the data symbols, the signaling symbols, and/or the pilot symbols, if applicable, and may provide T output symbol streams to T modulators/demodulators (MOD/DEMOD) 1024a through 1024t. Each MOD/DEMOD 1024 may process a respective output symbol stream (e.g., for OFDM, SC-FDM, etc.) to obtain an output sample stream. Each MOD/DEMOD 1024 may further process (e.g., convert to analog, amplify, filter, and upconvert) the output sample stream to obtain a forward link signal. T forward link signals from MOD/DEMODs 1024a through 1024t may be transmitted via T antennas 1022a through 1022t, respectively.

At terminal 106, antennas 1026a through 1026r may receive the forward link signals from base station 104 and may provide received signals to MOD/DEMODs 1028a through 1028r, respectively. Each MOD/DEMOD 1028 may condition (e.g., filter, amplify, downconvert, and digitize) a respective received signal to obtain received samples. Each MOD/DEMOD 1028 may further process the received samples (e.g., for OFDM, SC-FDM, etc.) to obtain received symbols. A MIMO detector 1030 may obtain received symbols from all R MOD/DEMODs 1028a through 1028r, perform MIMO detection on the received symbols if applicable, and provide detected symbols. A receive processor 1032 may process (e.g., demodulate, de-interleave, and decode) the detected symbols, provide decoded packets for terminal 106 to a data sink 1034, and provide decoded messages to a controller/processor 1036.

At DRR 110, antennas 1046a through 1046q may receive the forward link signals from base station 104 and may provide received signals to MOD/DEMODs 1048a through 1048q, respectively. Each MOD/DEMOD 1048 may condition (e.g., filter, amplify, downconvert, and digitize) a respective received signal to obtain received samples. Each MOD/DEMOD 1048 may further process the received samples (e.g., for OFDM, SC-FDM, etc.) to obtain received symbols. According to one aspect, a DRR 110 may be capable of providing diversity retransmission for a plurality of terminals 106. Accordingly, a MIMO detector 1050 may obtain received symbols from all R MOD/DEMODs 1028a through 1028r, perform MIMO detection on the received symbols if applicable, and provide detected symbols. A receive processor 1052 may process (e.g., demodulate, de-interleave, and decode) the detected symbols, provide decoded packets for terminal 106 to a data sink 1054, and provide decoded messages to a controller/processor 1056.

Referring to FIGS. 10A and 10B, memories 1010, 1038 and 1058 may store data and program codes for base station 104, terminal 106, and DRR 110, respectively. Scheduler 1014 of the base station 104 may schedule terminals 106 for data transmission on the forward and/or reverse links and may provide resource grants for the scheduled terminals.

Referring to FIG. 10B, according to one aspect, the example DRR 110 controller/processor 1056 may, if the decoded message is a first transmission of a data packet, such as depicted at block 902 of the FIG. 9 example flow 900, store the decoded message in, for example, the memory 1058. Example reverse link operations of the FIG. 10B example DRR 110 for determining if a decoded message is a first transmission or a retransmission are described in greater detail below.

Also at the FIG. 10A example terminal 106, for reverse link signal processing a transmit processor 1042 may receive and process packets of data from a data source 1044 and receive messages (e.g., for resource requests) from controller/processor 1036. The symbols from transmit processor 1042 may be precoded by a TX MIMO processor 1040 if applicable, further processed by MOD/DEMODs 1028a through 1028r, and transmitted to base station 104.

At the FIG. 10A example base station 104, the reverse link signals (e.g. ACK/NAK) from terminal 106 may be received by antennas 1022, processed by MOD/DEMODs 1024, detected by a MIMO detector 1020 if applicable, and further processed (e.g., demodulated, de-interleaved, and decoded) by a receive processor 1018 to send decoded packets from the terminal 106 to a data sink 1016.

Similarly, at the FIG. 10B example DRR 110, the reverse link signals (e.g. ACK/NAK) from terminal 106 may be received by antennas 1046, processed by MOD/DEMODs 1048, detected by a MIMO detector 1050 if applicable, and further processed by a receive processor 1052 to send to the data sink 1054 the decoded packets and messages transmitted by terminal 106.

Controllers/processors 1012, 1036 and 1056 may direct the operation at base station 104, terminal 106, and DRR 110, respectively. Controller/processor 1012 at base station 104 may perform or direct base station 104 to perform, and/or cooperate with one or both of the terminal controller/processor 1036 or DRR 110 controller/processor 1056 for transmission from the base station 104 to the terminal 106 and DRR 110 of HS-SCCH scheduling messages and HS-PDSCH data packets such as, for example, depicted in one or more of the example timings 500, 600, 700 or 800, or as shown within the example method flow 900, and may perform or direct base station 104 power level and MAC packet size, based on CQIs received from the terminal 106 and/or from the DRR 110.

Likewise, controller/processor 1036 at terminal 106 may perform, or control the terminal 106 to perform, and/or cooperate with one or both of the terminal controller/processor 1036 or DRR 110 controller/processor 1056 for transmission of CQI reports, receiving HS-SCCH scheduling messages, receiving and decoding HS-PDSCH data packets, decoding HS-PDSCH data packets and transmitting ACK/NAK signals such as, for example, as depicted in one or more of the example timings 500, 600, 700 or 800, or as shown within the example method flow 900, and may perform or direct base station 104 power level and MAC packet size based on, for example, CQIs received from the terminal 106 and/or from the DRR 110.

Controller/processor 1056 at DRR 110 may perform or control DRR 110 to perform, and/or cooperate with one or both of the base station controller/processor 1012 or terminal controller/processor 1036 for receiving base station 104 HS-SCCH scheduling messages, receiving terminal 106 ACK/NAK messages, determining based on the ACK/NAK messages if a next HS-PDSCH transmission from the base station 104 will be a retransmission, storing HS-PDSCH data packets, retrieving and decoding stored HS-PDSCH data packets, and retransmitting as a diversity signal the retrieved HS-PDSCH data packets, repeating ACK/NAK message and repeating, with or without modification, CQI reports such as, for example, as depicted in one or more of the example timings 500, 600, 700 or 800, or as shown within the example method flow 900.

Retransmission by the FIG. 10B example DRR 110 of HS-PDSCH data packets, transmission of a pilot from the DRR 110, as well as transmission by the example DRR 110 of repeated ACK/NAK messages, may be performed by, for example, a data source 1064 and/or the controller/processor 1056 sending messages to a transmit processor 1062, which may process (e.g., encode, interleave, and symbol map) the messages and send these to a transmit (TX) MIMO processor 1060 for spatial processing, if applicable, and sending to one or more of the Q MOD/DEMODs 1048.

Among various features and benefits of a diversity retransmission relay according to the various exemplary embodiments, such as DRR 110, is that the DRR 110 may be deployed without change or setup required for infrastructure (e.g., base stations 104, NodeBs) or user equipments (e.g., terminals 106) although advantages may be obtained by configuration considerations as described above. Furthermore, it has minimal prerequisite requirements on terminals 106, i.e. earlier release/lower capability terminals 106 can be supported as well as recent high-capability terminals 106. Since the DRR 110 may be a MAC level forwarding node, it can achieve MAC level gains over the backhaul (from the cell) and access link (to the terminal 106). Another advantage provided by one or more aspects of the DRR 110 is that it does not have to have instantaneous switching time between transmit and receive. Rather, there is considerable guard time, up to a slot or more. This typically also allows for lower cost and more flexibility for synchronization requirements.

In view of exemplary systems shown and described above, methodologies that may be implemented in accordance with the disclosed subject matter, will be better appreciated with reference to various flow charts. While, for purposes of simplicity of explanation, methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g. device, system, process, component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram. Further, the various methods disclosed herein can include employing a processor executing computer executable instructions stored on a computer readable storage medium to implement the methods.

It will be appreciated that data store (e.g., memories) components described herein may include or may be implemented using volatile memory, nonvolatile memory, or both. Nonvolatile memory may include or may be implemented with any non-volatile memory technology capable of meeting performance requirements pertaining to the particular memory function implemented, which can be readily ascertained by persons of ordinary skill in the art upon reading this disclosure, and may include, as illustrative but limitative examples, read only memory (ROM), programmable ROM (PROM), electrically programmable ROM (EPROM), electrically erasable ROM (EEPROM), or flash memory. Volatile memory may include or may be implemented with any volatile memory technology capable of meeting performance requirements pertaining to the particular memory function implemented, which can be readily ascertained by persons of ordinary skill in the art upon reading this disclosure, and may include, as illustrative but limitative examples, synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the various aspects is intended to comprise, without being limited to, these and any other suitable types of memory.

It is to be understood that aspects described herein may be implemented by hardware, software, firmware or any combination thereof. When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the steps and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or embodiments, it should be noted that various changes and modifications could be made herein without departing from the scope of described aspects and/or embodiments as defined by the appended claims. Accordingly, described aspects are intended to embrace all such alterations, modifications and variations that fall within scope of appended claims. Furthermore, although elements of described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The invention claimed is:

1. A method for cellular communication, comprising:
receiving and storing at a diversity relay a first transmission of a data packet from a cell to a destination terminal;
receiving at the diversity relay a response information indicating at least one of a response or a non-response by the destination terminal to said first transmission;
determining, based on said response information, whether or not a future transmission of a data packet from the cell to the destination terminal will be a retransmission of the data packet of the first transmission;
receiving at the diversity relay at least a portion of a scheduling information identifying a schedule for a second transmission of a data packet from the cell to the destination terminal; and
in response to said receiving at least the portion of the scheduling information, if the determining indicated the future transmission will be a retransmission, retrieving the stored data packet of the first transmission and transmitting the retrieved data packet from the diversity relay to the destination terminal, else storing at the diversity relay a data packet of the second transmission as a new first transmission of a data packet.

2. The method of claim 1, wherein said response information indicates at least one of a presence or an absence of an acknowledgment transmission from the destination terminal to the cell.

3. The method of claim 2, wherein said response information includes the diversity relay receiving, or not receiving an acknowledgment signal, wherein said method further comprises the diversity relay transmitting a copy of said acknowledgment signal simultaneously with a user repetition of said acknowledgment signal.

4. The method of claim 1, wherein retrieving and transmitting the received data packet includes encoding the retrieved data packet according to a new coding indicated by the scheduling information and transmitting the retrieved data packet encoded according to the new coding.

5. The method of claim 1, wherein the scheduling information includes a first part preceding a second part, the first part including an identifier of the destination terminal and the second part including a retransmission count value indicating whether or not a data packet associated with the scheduling information is a first transmission or a retransmission.

6. The method of claim 5, wherein if the determining indicates the future transmission will be a retransmission, the retrieving retrieves the stored data packet prior to the diversity relay receiving the second part of the scheduling information.

7. The method of claim 6, further comprising:
detecting at the diversity relay a pattern of an incremental redundancy used by the cell; and
identifying at the diversity relay an encoding of a data packet of the future transmission, prior to the diversity relay receiving the future transmission, based on said detected pattern,
wherein said retrieving includes encoding the retrieved stored data packet according to the identified encoding.

8. The method of claim 1, further comprising:
  detecting at the diversity relay a pattern of an incremental redundancy used by the cell; and
  identifying at the diversity relay an encoding of a data packet of the future transmission, prior to the diversity relay receiving the future transmission, based on said detected pattern.

9. The method of claim 1, wherein storing the data packet of the first transmission includes decoding said data packet into a decoded first data packet, according to a given coding scheme, and storing said decoded first data packet, and wherein retrieving the stored data packet of the first transmission and transmitting the retrieved data packet from the diversity relay to the destination terminal includes re-encoding the decoded first data packet into an encoded first data packet, according to said given coding scheme, and transmitting said encoded first data packet to said destination terminal.

10. The method of claim 1, wherein the data packet of the first transmission is an encoded data packet, wherein storing the data packet of the first transmission includes storing said encoded data packet, and wherein retrieving the stored data packet of the first transmission and transmitting the retrieved data packet from the diversity relay to the destination terminal includes retrieving the encoded data packet and transmitting said encoded data packet to said destination terminal.

11. The method of claim 1, further comprising transmitting from the diversity relay to a terminal a downlink pilot channel, said transmitting being according to a timing cooperative with a timing of a transmission of a pilot from the cell to the terminal.

12. The method of claim 11, wherein said timing of said transmitting a downlink pilot signal from the diversity relay to the terminal is configured to transmit the downlink pilot signal while the diversity relay is not receiving and storing data packets of transmissions from the cell.

13. The method of claim 11, wherein the diversity relay transmits the downlink pilot channel during a given time interval of a measurement of the downlink channel at the terminal, and prior to a reporting by the terminal of a channel quality indication associated with said measurement.

14. The method of claim 1, further comprising a transmission from the diversity relay to the cell a channel quality information identifying a channel from the cell to the destination terminal, wherein said channel quality information has a value independent of a channel quality information transmitted from the destination terminal to the cell for said channel.

15. The method of claim 1, further comprising a selecting at the diversity relay of one or more destination terminals from among a plurality of terminals linked to the cell, wherein the selecting is based on at least one of a response signal timing pattern between the terminals and the base station, or a conflict between a channel quality indicator (CQI) report timing of the terminals and a timing of transmissions of the diversity relay with respect to one or more current destination terminals.

16. The method of claim 15, wherein the response signal is an ACK/NAK signal of a hybrid automatic repeat request (HARQ), and the timing pattern is a HARQ timing pattern.

17. The method of claim 16, further comprising at least one of the plurality of terminals transmitting channel quality indicator (CQI) reports according to a given CQI report timing, wherein at least one current destination terminal transmits ACK/NAK signals according to a given feedback cycle timing, and wherein the selecting is based, at least in part, one or more of the current destination terminals having feedback cycle timing that does not overlap the selected destination terminal's CQI report timing.

18. The method of claim 15, wherein the transmissions of data packet signals from the cell and from the diversity relay are according to a hybrid automatic repeat request (HARQ) protocol, wherein the transmissions of response signals from the terminals are according to an ACK/NAK of a HARQ protocol, wherein each of the plurality of terminals has a corresponding HARQ interlace, and wherein the selecting is based, at least in part, on the terminal selected having the HARQ interlace as one or more current destination terminals.

19. The method of claim 15, wherein the transmissions of data packet signals from the cell and from the diversity relay, are according to a hybrid automatic repeat request (HARQ) protocol, wherein the transmissions of response signals from the terminals are according to an ACK/NAK of a HARQ protocol, wherein each of the plurality of terminals has a corresponding HARQ interlace, and wherein the selecting is based, at least in part, on the terminal selected having an HARQ interlace spaced sufficiently to meet a given criteria.

20. A diversity relay for a cellular communication system, comprising:
  a scheduling receiver to receive transmission of a scheduling information signal, from a cell to a destination terminal, identifying the destination terminal;
  a data receiver to receive transmission of a data packet signal from a cell to a destination terminal and to extract a corresponding data packet;
  a storage to retrievably store said data packet;
  a response receiver to receive a response information signal from the destination terminal associated with a transmission from the cell to the destination terminal of the data packet signal;
  a controller to determine, based on at least one of receiving the response information signal or not receiving the response information signal after a first transmission of the data packet signal, whether or not a future transmission of a data packet signal will be a retransmission of the data packet of the first transmission and, if determining the future transmission to be a retransmission, performing a retransmitting in response to receiving a future scheduling information signal identifying said destination terminal; and
  a transmitter to transmit a diversity data packet signal based on said retransmitting,
  wherein said retransmission includes retrieving the stored data packet of the first transmission and transmitting the retrieved data packet from the diversity relay to the destination terminal.

21. A diversity relay in a cellular communication system, comprising:
  means for receiving a transmission of a data packet signal from a cell to a destination terminal and for extracting a corresponding data packet;
  means for storing said data packet as a first transmission of said data packet;
  means for receiving a response information indicating at least one of a response or a non-response by the destination terminal to said transmission of a data packet signal;
  means for determining, based on said response information, whether or not a future transmission of a data packet signal from the cell to the destination terminal will be have retransmission of the data packet of the first transmission; and means for receiving at least a portion of a scheduling information signal identifying a schedule for a second transmission of a data packet from the cell to the destination terminal; and means for retrieving, in response to said receiving at least the portion of the scheduling information and after said means for determining determines the future transmission will be a retransmission, the stored first transmission of said data packet and transmitting the retrieved first transmission of said data packet to the destination terminal.

* * * * *